(12) United States Patent
Stoyles et al.

(10) Patent No.: US 11,762,619 B2
(45) Date of Patent: *Sep. 19, 2023

(54) CONTROLLING EXTERNAL DEVICES USING REALITY INTERFACES

(71) Applicant: Apple Inc., Cupertino, CA (US)

(72) Inventors: Justin D. Stoyles, San Francisco, CA (US); Michael Kuhn, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,114

(22) Filed: Aug. 4, 2021

(65) Prior Publication Data

US 2021/0365228 A1    Nov. 25, 2021

Related U.S. Application Data

(63) Continuation of application No. 16/802,320, filed on Feb. 26, 2020, now Pat. No. 11,086,581, which is a
(Continued)

(51) Int. Cl.
*G06F 3/14* (2006.01)
*G06T 19/00* (2011.01)
(Continued)

(52) U.S. Cl.
CPC ....... *G06F 3/1423* (2013.01); *G02B 27/0093* (2013.01); *G02B 27/017* (2013.01);
(Continued)

(58) Field of Classification Search
CPC ........ G06F 3/1423; G06F 3/013; G06F 3/017; G06F 3/0346; G06F 3/04815;
(Continued)

(56) References Cited

U.S. PATENT DOCUMENTS

| 5,664,133 A | 9/1997 | Malamud et al. |
| 5,949,432 A | 9/1999 | Gough et al. |

(Continued)

FOREIGN PATENT DOCUMENTS

| CN | 102843523 A | 12/2012 |
| CN | 103460256 A | 12/2013 |

(Continued)

OTHER PUBLICATIONS

Applicant-Initiated Interview Summary received for U.S. Appl. No. 17/052,081, dated Oct. 18, 2021, 4 pages.
(Continued)

*Primary Examiner* — Ibrahim A Khan
(74) *Attorney, Agent, or Firm* — DLA Piper LLP (US)

(57) ABSTRACT

In some exemplary processes for controlling an external device using a computer-generated reality interface, information specifying a function of the external device is received from the external device. First image data of a physical environment that includes the external device is obtained with one or more image sensors. A representation of the physical environment according to the first image data is displayed on a display. While displaying the representation of the physical environment, second image data identifying a gesture occurring between the display and the external device in the physical environment is obtained with the one or more image sensors. A determination is made as to whether the identified gesture satisfies one or more predetermined criteria associated with the function. In accordance with determining that the identified gesture satisfies one or more predetermined criteria associated with the function, the external device is caused to perform the function.

20 Claims, 13 Drawing Sheets

Related U.S. Application Data continuation of application No. PCT/US2018/053422, filed on Sep. 28, 2018.

(60) Provisional application No. 62/734,678, filed on Sep. 21, 2018, provisional application No. 62/566,206, filed on Sep. 29, 2017, provisional application No. 62/566,080, filed on Sep. 29, 2017, provisional application No. 62/566,073, filed on Sep. 29, 2017.

(51) Int. Cl.
   | | |
   |---|---|
   | *H04B 5/00* | (2006.01) |
   | *G06T 7/73* | (2017.01) |
   | *G06F 3/01* | (2006.01) |
   | *G06F 3/0346* | (2013.01) |
   | *G02B 27/00* | (2006.01) |
   | *G02B 27/01* | (2006.01) |
   | *G06F 3/04815* | (2022.01) |
   | *G06F 3/04842* | (2022.01) |
   | *G06V 20/20* | (2022.01) |
   | *G06V 40/20* | (2022.01) |

(52) U.S. Cl.
   CPC .............. *G06F 3/013* (2013.01); *G06F 3/017* (2013.01); *G06F 3/0346* (2013.01); *G06F 3/04815* (2013.01); *G06F 3/04842* (2013.01); *G06T 7/74* (2017.01); *G06T 19/006* (2013.01); *G06V 20/20* (2022.01); *G06V 40/20* (2022.01); *H04B 5/0025* (2013.01); *G02B 2027/0187* (2013.01)

(58) Field of Classification Search
   CPC .... G06F 3/04842; G06F 3/011; G06F 3/0484; G02B 27/0093; G02B 27/017; G02B 2027/0187; G06T 7/74; G06T 19/006; G06V 20/20; G06V 40/20; H04B 5/0025
   See application file for complete search history.

(56) References Cited

U.S. PATENT DOCUMENTS

| | | | |
|---|---|---|---|
| 8,408,706 | B2 | 4/2013 | Yahav |
| 10,110,678 | B2* | 10/2018 | Hebsur .................. G06F 3/011 |
| 10,248,399 | B2* | 4/2019 | Yoon ....................... H04L 67/34 |
| 10,353,532 | B1* | 7/2019 | Holz ...................... G06F 3/04812 |
| 2007/0162872 | A1 | 7/2007 | Hong et al. |
| 2008/0181452 | A1 | 7/2008 | Kwon et al. |
| 2008/0307360 | A1 | 12/2008 | Chaudhri et al. |
| 2011/0037712 | A1* | 2/2011 | Kim ....................... G06F 3/0488 345/173 |
| 2012/0249416 | A1 | 10/2012 | Maciocci et al. |
| 2013/0042296 | A1* | 2/2013 | Hastings .............. G06Q 50/184 726/1 |
| 2013/0050258 | A1* | 2/2013 | Liu ......................... G06F 3/013 345/633 |
| 2013/0050432 | A1* | 2/2013 | Perez ..................... G06F 3/011 348/47 |
| 2013/0241805 | A1 | 9/2013 | Gomez |
| 2013/0283208 | A1 | 10/2013 | Bychkov et al. |
| 2013/0328762 | A1 | 12/2013 | Mcculloch et al. |
| 2014/0043227 | A1 | 2/2014 | Skogoe et al. |
| 2014/0160001 | A1* | 6/2014 | Kinnebrew ........... G06F 3/0482 345/156 |
| 2014/0184550 | A1 | 7/2014 | Hennessey et al. |
| 2014/0204002 | A1* | 7/2014 | Bennet .................. G06T 19/006 345/7 |
| 2014/0253592 | A1 | 9/2014 | Cho |
| 2015/0084857 | A1* | 3/2015 | Kimura .................. G06F 1/163 345/156 |
| 2015/0100803 | A1 | 4/2015 | Chen et al. |
| 2015/0130716 | A1 | 5/2015 | Sridharan et al. |
| 2015/0138079 | A1 | 5/2015 | Lannsjö |
| 2015/0205494 | A1 | 7/2015 | Scott et al. |
| 2015/0268821 | A1 | 9/2015 | Ramsby et al. |
| 2015/0293592 | A1 | 10/2015 | Cheong et al. |
| 2015/0317518 | A1* | 11/2015 | Fujimaki ............... G02B 27/017 345/633 |
| 2015/0317837 | A1 | 11/2015 | Sholudko et al. |
| 2015/0323990 | A1 | 11/2015 | Maltz |
| 2016/0018645 | A1 | 1/2016 | Haddick et al. |
| 2016/0018654 | A1* | 1/2016 | Haddick .................. G06F 3/011 345/8 |
| 2016/0025981 | A1 | 1/2016 | Burns et al. |
| 2016/0026253 | A1* | 1/2016 | Bradski ................. H04N 13/128 345/8 |
| 2016/0116980 | A1 | 4/2016 | George-Svahn et al. |
| 2016/0182877 | A1 | 6/2016 | Deluca |
| 2016/0262614 | A1 | 9/2016 | Ninomiya et al. |
| 2016/0267708 | A1 | 9/2016 | Nistico et al. |
| 2016/0274762 | A1 | 9/2016 | Lopez et al. |
| 2016/0292759 | A1 | 10/2016 | Gonzalez et al. |
| 2016/0295038 | A1 | 10/2016 | Rao et al. |
| 2016/0371888 | A1 | 12/2016 | Wright et al. |
| 2016/0379418 | A1 | 12/2016 | Osborn et al. |
| 2017/0038829 | A1 | 2/2017 | Lanier et al. |
| 2017/0060230 | A1 | 3/2017 | Faaborg et al. |
| 2017/0099481 | A1 | 4/2017 | Held et al. |
| 2017/0134553 | A1* | 5/2017 | Jeon ....................... H04W 4/08 |
| 2017/0153701 | A1 | 6/2017 | Mahon et al. |
| 2017/0185156 | A1 | 6/2017 | Shotton et al. |
| 2017/0185276 | A1* | 6/2017 | Lee ................... H04N 21/43615 |
| 2017/0194768 | A1 | 7/2017 | Powers et al. |
| 2017/0221276 | A1* | 8/2017 | Osborn .................. G06T 11/40 |
| 2017/0237974 | A1 | 8/2017 | Samec et al. |
| 2017/0318019 | A1 | 11/2017 | Gordon et al. |
| 2018/0004283 | A1* | 1/2018 | Mathey-Owens ........................... G06F 3/04842 |
| 2018/0054487 | A1* | 2/2018 | Hebsur .................. H04L 41/22 |
| 2018/0081171 | A1* | 3/2018 | Park ....................... H04N 19/176 |
| 2018/0204385 | A1* | 7/2018 | Sarangdhar ........... G06T 19/003 |
| 2018/0249086 | A1 | 8/2018 | Ozawa et al. |
| 2019/0025910 | A1 | 1/2019 | Gilra |
| 2019/0122420 | A1 | 4/2019 | Terahata |
| 2019/0244416 | A1 | 8/2019 | Tamaoki et al. |
| 2019/0318660 | A1 | 10/2019 | Kimoto |
| 2020/0192622 | A1 | 6/2020 | Stoyles et al. |
| 2020/0201444 | A1 | 6/2020 | Stoyles et al. |
| 2020/0225746 | A1 | 7/2020 | Bar-Zeev et al. |
| 2020/0225747 | A1 | 7/2020 | Bar-Zeev et al. |
| 2020/0301553 | A1* | 9/2020 | Taylor ................. G06F 3/04812 |
| 2021/0240331 | A1 | 8/2021 | Olson et al. |
| 2022/0012002 | A1 | 1/2022 | Bar-Zeev et al. |
| 2022/0083303 | A1 | 3/2022 | Stoyles et al. |

FOREIGN PATENT DOCUMENTS

| | | |
|---|---|---|
| CN | 104516497 A | 4/2015 |
| CN | 105009039 A | 10/2015 |
| CN | 105493501 A | 4/2016 |
| CN | 106164818 A | 11/2016 |
| CN | 106371206 A | 2/2017 |
| CN | 106415444 A | 2/2017 |
| CN | 106462733 A | 2/2017 |
| CN | 106951069 A | 7/2017 |
| EP | 2940556 A1 | 11/2015 |
| EP | 2947546 A1 | 11/2015 |
| EP | 3118722 A1 | 1/2017 |
| JP | 2004-513403 A | 4/2004 |
| JP | 2005-157329 A | 6/2005 |
| JP | 2015-90635 A | 5/2015 |
| JP | 2015-126857 A | 7/2015 |
| JP | 2016-502120 A | 1/2016 |
| JP | 2016085588 A | 5/2016 |
| JP | 2016-192132 A | 11/2016 |
| KR | 10-2007-0067332 A | 6/2007 |
| KR | 10-2015-0125472 A | 11/2015 |
| WO | 2013/144807 A1 | 10/2013 |

(56) References Cited

FOREIGN PATENT DOCUMENTS

| | | |
|---|---|---|
| WO | 2015/110852 A1 | 7/2015 |
| WO | 2017/031089 A1 | 2/2017 |

OTHER PUBLICATIONS

Office Action received for Chinese Patent Application No. 201880055893.6, dated Sep. 6, 2021, 21 pages (6 pages of English Translation and 15 pages of Official Copy).
Office Action received for Korean Patent Application No. 10-2020-7006018, dated Oct. 9, 2021, 9 pages (4 pages of English Translation and 5 pages of Official Copy).
Office Action received for Chinese Patent Application No. 201880052303.4, dated Sep. 27, 2021, 20 pages (7 pages of English Translation and 13 pages of Official Copy).
Notice of Allowance received for Chinese Patent Application No. 201880052303.4, dated Mar. 9, 2022, 4 pages (1 page of English Translation and 3 pages of Official Copy).
Applicant-Initiated Interview Summary received for U.S. Appl. No. 16/828,852, dated Jun. 8, 2021, 2 pages.
Applicant-Initiated Interview Summary received for U.S. Appl. No. 16/828,857, dated Jun. 10, 2021, 3 pages.
Corrected Notice of Allowance received for U.S. Appl. No. 16/828,857, dated Sep. 1, 2021, 3 pages.
Decision to Grant received for Japanese Patent Application No. 2020-512573, dated Aug. 2, 2021, 3 pages (1 page of English Translation and 2 pages of Official Copy).
Final Office Action received for U.S. Appl. No. 16/802,188, dated May 14, 2021, 18 pages.
Non-Final Office Action received for U.S. Appl. No. 17/052,081, dated Jul. 14, 2021, 16 pages.
Notice of Allowance received for U.S. Appl. No. 16/802,188, dated Jul. 29, 2021, 8 pages.
Notice of Allowance received for U.S. Appl. No. 16/828,852, dated Jul. 27, 2021, 10 pages.
Notice of Allowance received for U.S. Appl. No. 16/828,857, dated Jul. 14, 2021, 6 pages.
Office Action received for European Patent Application No. 18786644.7, dated Apr. 28, 2021, 6 pages.
Office Action received for Japanese Patent Application No. 2020-512573, dated Apr. 12, 2021, 7 pages (4 pages of English Translation and 3 pages of Official Copy).
Stellmach et al., "Look & Touch: Gaze-supported Target Acquisition", CHI'12: Proceedings of the SIGGHI Conference on Human Factors in Computing Systems; Available online at: https://dl.acm.org/doi/10.1145/2207676.2208709, May 5-10, 2012, pp. 2981-2990.
Stellmach et al., "Still Looking: Investigating Seamless Gaze-supported Selection, Positioning, and Manipulation of Distant Targets", CHI'13: Proceedings of the SIGCHI Conference on Human Factors in Computing Systems; Available online at: https://dl.acm.org/doi/10.1145/2470654.2470695, Apr. 2013, pp. 285-294.
Notice of Allowance received for U.S. Appl. No. 17/052,081, dated Jan. 14, 2022, 7 pages.
Applicant-Initiated Interview Summary received for U.S. Appl. No. 16/802,188, dated Mar. 23, 2021, 2 pages.
Applicant-Initiated Interview Summary received for U.S. Appl. No. 16/802,320, dated Apr. 9, 2021, 2 pages.
Applicant-Initiated Interview Summary received for U.S. Appl. No. 16/828,852, dated Jan. 27, 2021, 4 pages.
Final Office Action received for U.S. Appl. No. 16/828,852, dated Mar. 9, 2021, 16 pages.
International Preliminary Report on Patentability received for PCT Patent Application No. PCT/US2018/053415, dated Apr. 9, 2020, 10 pages.
International Preliminary Report on Patentability received for PCT Patent Application No. PCT/US2018/053422, dated Apr. 9, 2020, 10 pages.
International Preliminary Report on Patentability received for PCT Patent Application No. PCT/US2018/053427, dated Apr. 9, 2020, 14 pages.
International Preliminary Report on Patentability received for PCT Patent Application No. PCT/US2018/053428, dated Apr. 9, 2020, 8 pages.
International Preliminary Report on Patentability received for PCT Patent Application No. PCT/US2019/028980, dated Nov. 19, 2020, 10 pages.
International Search Report and Written Opinion received for PCT Patent Application No. PCT/US2018/053415, dated Dec. 13, 2018, 14 pages.
International Search Report and Written Opinion received for PCT Patent Application No. PCT/US2018/053422, dated Dec. 19, 2018, 13 pages.
International Search Report and Written Opinion received for PCT Patent Application No. PCT/US2018/053427, dated Mar. 25, 2019, 18 pages.
International Search Report and Written Opinion received for PCT Patent Application No. PCT/US2018/053428, dated Jan. 25, 2019, 9 pages.
International Search Report and Written Opinion received for PCT Patent Application No. PCT/US2019/028980, dated Aug. 16, 2019, 14 pages.
Invitation to Pay Additional Fees received for PCT Patent Application No. PCT/US2018/053427, mailed on Feb. 1, 2019, 13 pages.
Non-Final Office Action received for U.S. Appl. No. 16/802,188, dated Dec. 16, 2020, 15 pages.
Non-Final Office Action received for U.S. Appl. No. 16/802,320, dated Dec. 24, 2020, 19 pages.
Non-Final Office Action received for U.S. Appl. No. 16/828,852, dated Nov. 9, 2020, 14 pages.
Non-Final Office Action received for U.S. Appl. No. 16/828,857, dated Feb. 17, 2021, 12 pages.
Notice of Allowance received for U.S. Appl. No. 16/802,320, dated Apr. 30, 2021, 9 pages.
Office Action received for Chinese Patent Application No. 201880051530.5, dated Sep. 6, 2021, 18 pages (6 pages of English Translation and 12 pages of Official Copy).
Notice of Allowance received for Chinese Patent Application No. 201880055893.6, dated Mar. 30, 2022, 4 pages (1 page of English Translation and 3 pages of Official Copy).
Notice of Allowance received for Korean Patent Application No. 10-2020-7006018, dated Apr. 18, 2022, 4 pages (1 page of English Translation and 3 pages of Official Copy).
Takase et al., "Gestural Interface and the Intuitive Interaction with Virtual Objects", ICROS-SICE International Joint Conference, 2009, pp. 3260-3263.
Wang, Zichuan, "Transmissive smart glasses based on image recognition and gesture tracking", Innovation Technology Frontier, pp. 26-28 (Official Copy Only). {See Communication under 37 CFR § 1.98(a) (3)}.
Non-Final Office Action received for U.S. Appl. No. 17/486,646, dated Jun. 15, 2022, 17 pages.
Non-Final Office Action received for U.S. Appl. No. 17/534,102, dated Jul. 7, 2022, 14 pages.
Notice of Allowance received for Chinese Patent Application No. 201880051530.5, dated Apr. 8, 2022, 5 pages (1 page of English Translation and 4 pages of Official Copy).
Office Action received for Korean Patent Application No. 10-2022-7022762, dated Jul. 19, 2022, 9 pages (4 pages of English Translation and 5 pages of Official Copy).
Kunhee et al., "Distant 3D Object Grasping with Gaze-supported Selection", The 12th International Conference on Ubiquitous Robots and Ambient Intelligence (URAI 2015), Oct. 28-30, 2015, pp. 541-544.
Liu et al., "Video avatar-based remote video collaboration", Journal of Beijing University of Aeronautics and Astronautics, vol. 41, No. 6, Jun. 2015, pp. 1087-1094 (Official Copy Only). { See Communication under 37 CFR § 1.98(a) (3)}.
Applicant-Initiated Interview Summary received for U.S. Appl. No. 17/486,646, dated Aug. 23, 2022, 2 pages.

(56) References Cited

OTHER PUBLICATIONS

Applicant-Initiated Interview Summary received for U.S. Appl. No. 17/486,646, dated Dec. 28, 2022, 2 pages.

Applicant-Initiated Interview Summary received for U.S. Appl. No. 17/534,102, dated Sep. 27, 2022, 2 pages.

Businesswire, "SMI Gaze Interaction Powers Google Glass Prototype", Online Available at: https://www.youtube.com/watch?v=R3xxqap7DmQ&t=1s, Mar. 3, 2015, 3 pages.

Final Office Action received for U.S. Appl. No. 17/486,646, dated Oct. 5, 2022, 20 pages.

Final Office Action received for U.S. Appl. No. 17/534,102, dated Nov. 30, 2022, 14 pages.

Howmuchtech, "5 Best Smart Glasses of 2022", Online Available at: htttps://www.youtube.com/watch?v=xll2Ycc6Fv0&t=162s, Dec. 24, 2021, 6 pages.

Notice of Allowance received for U.S. Appl. No. 17/534,102, dated Jan. 11, 2023, 8 pages.

Office Action received for Japanese Patent Application No. 2021-142308, dated Oct. 31, 2022, 10 pages (7 pages of English Translation and 3 pages of Official Copy).

Special Effect, "Open Drive—Eye Gaze Games | Eye Gaze Controls & Options", Online Available at: https://www.youtube.com/watch?v=IJi2aOdSau8&t=63s, Mar. 18, 2022, 3 pages.

Summons to Attend Oral Proceedings received for European Patent Application No. 18786644.7, mailed on Nov. 10, 2022, 5 pages.

Brief Communication regarding Oral Proceedings received for European Patent Application No. 18786644.7, mailed on Feb. 27, 2023, 3 pages.

Decision to Refuse received for European Patent Application No. 18786644.7, dated Mar. 27, 2023, 9 pages.

Minutes of the Oral Proceedings received for European Patent Application No. 18786644.7, mailed on Mar. 24, 2023, 5 pages.

Notice of Allowance received for U.S. Appl. No. 17/486,646, dated Mar. 22, 2023, 9 pages.

Office Action received for Korean Patent Application No. 10-2022-7022762, dated Apr. 11, 2023, 8 pages (4 pages of English Translation and 4 pages of Official Copy).

Office Action received for Korean Patent Application No. 10-2022-7022762, dated Jan. 27, 2023, 6 pages (3 pages of English Translation and 3 pages of Official Copy).

Notice of Allowance received for U.S. Appl. No. 17/534,102, dated May 2, 2023, 8 pages.

* cited by examiner

Augmented Reality

CONTROLLING EXTERNAL DEVICES USING REALITY INTERFACES

CROSS-REFERENCE TO RELATED APPLICATIONS

This application is a continuation U.S. patent application Ser. No. 16/802,320, entitled "CONTROLLING EXTERNAL DEVICES USING REALITY INTERFACES," filed Feb. 26, 2020, which is a continuation of PCT Application No. PCT/US2018/053422, entitled "Controlling External Devices Using Reality Interfaces," filed Sep. 28, 2018, which claims priority from U.S. Patent Application Ser. No. 62/734,678, entitled "Gaze-Based User Interactions," filed Sep. 21, 2018; U.S. Patent Application Ser. No. 62/566,206, entitled "Gaze-Based User Interactions," filed Sep. 29, 2017; U.S. Patent Application Ser. No. 62/566,073, entitled "Accessing Functions of External Devices Using Reality Interfaces," filed Sep. 29, 2017; and U.S. Patent Application Ser. No. 62/566,080, entitled "Controlling External Devices Using Reality Interfaces," filed Sep. 29, 2017, which are each hereby incorporated by reference in their entirety.

FIELD

The present disclosure relates generally to reality interfaces, and more specifically to techniques for controlling an external device using a reality interface.

BRIEF SUMMARY

Techniques for interacting with external devices while using a computer-generated reality system, such as a virtual reality or mixed reality system, are desirable. The present disclosure describes techniques for controlling an external device using a computer-generated reality interface (also referred to herein as a reality interface). In some exemplary processes for controlling an external device using a reality interface, information specifying a function of an external device is received from the external device. First image data of a physical environment that includes the external device is obtained with one or more image sensors. A representation of the physical environment according to the first image data is displayed on a display. While displaying the representation of the physical environment, second image data identifying a gesture occurring between the display and the external device in the physical environment is obtained with the one or more image sensors. The processes determines whether the identified gesture satisfies one or more predetermined criteria associated with the function. In accordance with determining that the identified gesture satisfies one or more predetermined criteria associated with the function, the external device is caused to perform the function.

DETAILED DESCRIPTION

Figure 1A:
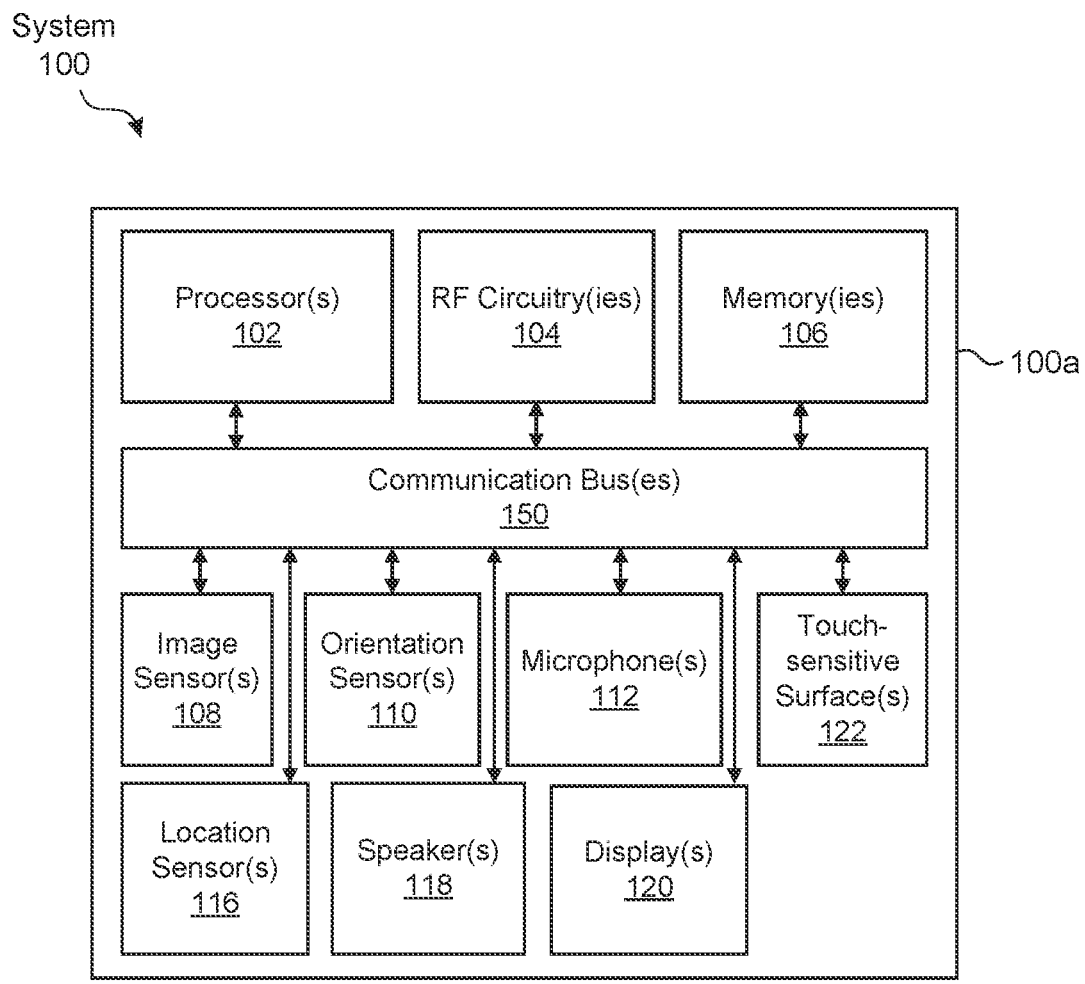
FIGS. 1A-1B depict exemplary systems for use in various computer-generated reality technologies, including virtual reality and mixed reality.

Various embodiments of electronic systems and techniques for using such systems in relation to various computer-generated reality technologies, including virtual reality and mixed reality (which incorporates sensory inputs from a physical environment), are described.

A computer-generated reality environment (e.g., virtual reality or mixed reality environment) can have varying degrees of virtual content and/or physical content. In some embodiments, a reality environment provides an intuitive interface for a user to interact with his/her physical environment. For example, using a reality interface that displays a representation of the user's physical environment, a user can control one or more external devices in the physical environment. Specifically, using the reality interface, the user is able to obtain information (e.g., operating status) regarding the one or more external devices or control a function of the one or more external devices. In some embodiments, the user can provide hand gestures to interact with the reality interface and cause an external device of the one or more external devices to perform a function. In accordance with some embodiments described herein, information specifying a function of an external device is received from the external device. First image data of a physical environment that includes the external device is obtained with one or more image sensors. A representation of the physical environment according to the first image data is displayed on a display. While displaying the representation of the physical environment, second image data identifying a gesture occurring between the display and the external device in the physical environment is obtained with the one or more image sensors. A determination is made as to whether the identified gesture satisfies one or more predetermined criteria associated with the function. In accordance with determining that the identified gesture satisfies one or more predetermined criteria associated with the function, the external device is caused to perform the function.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
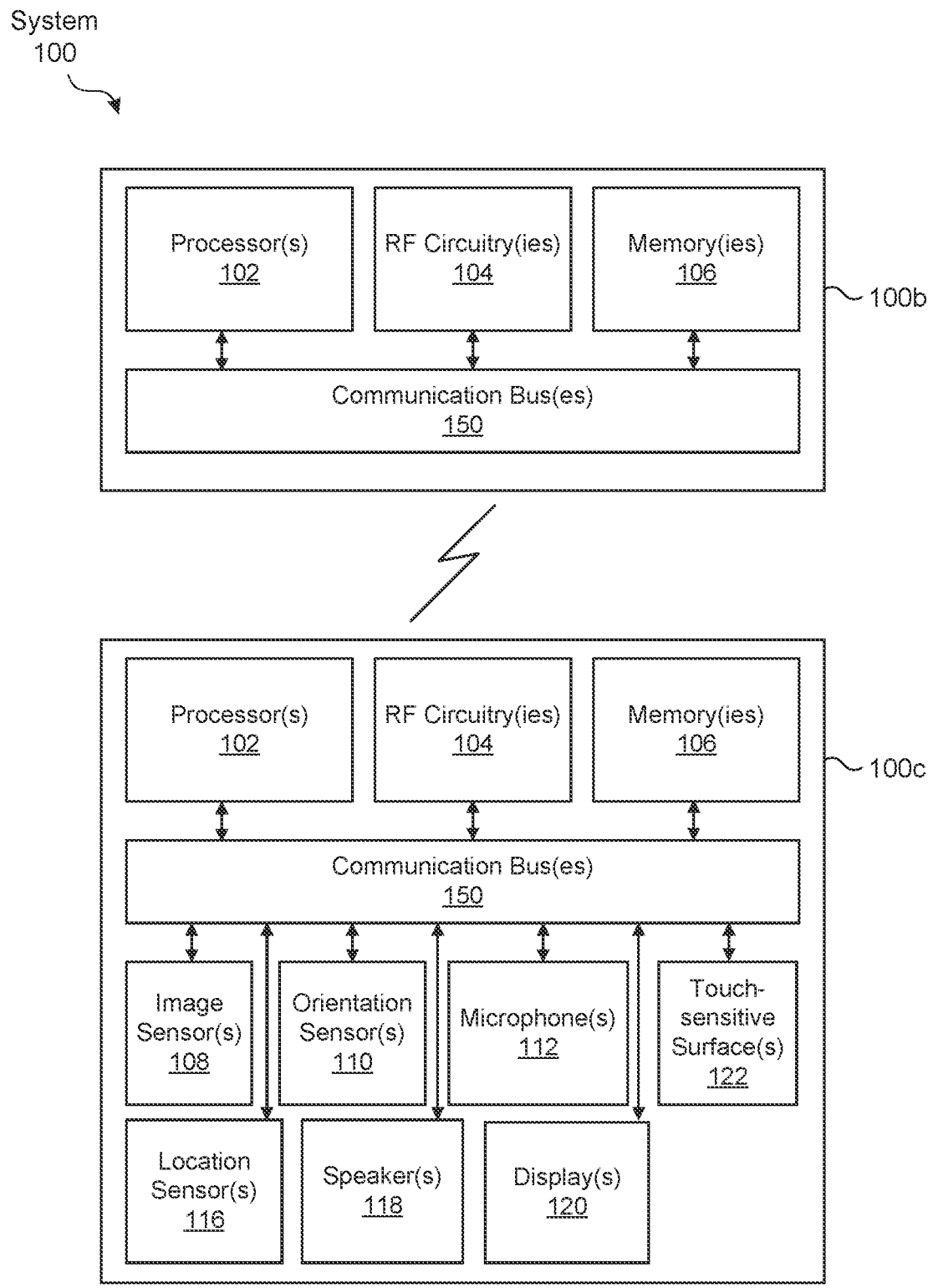

FIG. 1A and FIG. 1B depict exemplary system 100 for use in various computer-generated reality technologies, including virtual reality and mixed reality.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

Figure 1C:
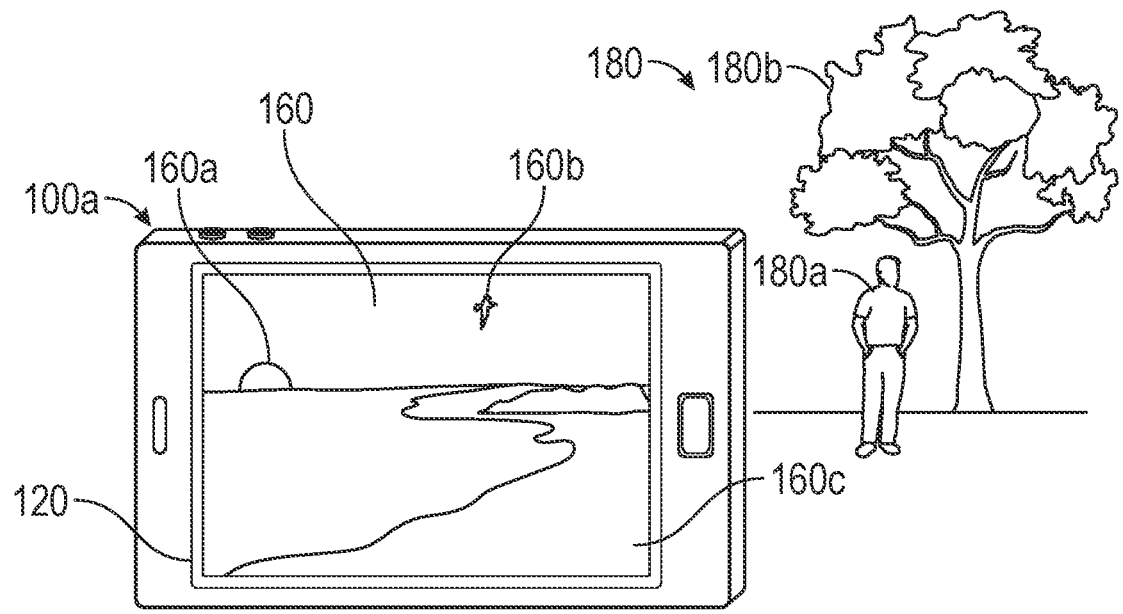
FIGS. 1C-1E illustrate examples of the system in the form of mobile devices.
Figure 1D:
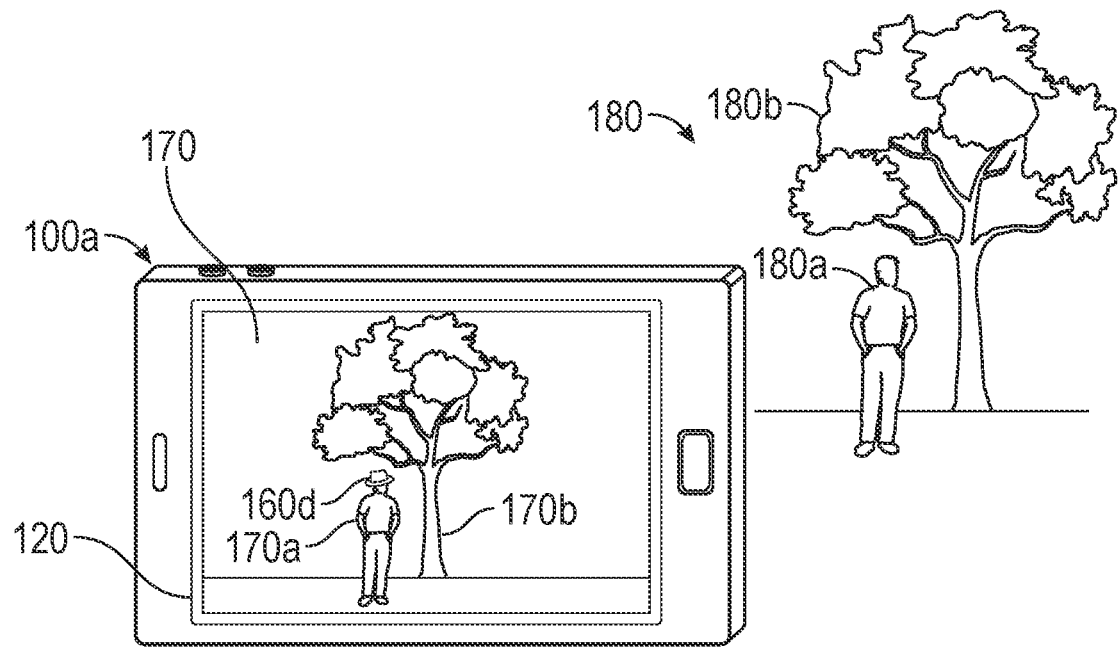
Figure 1E:
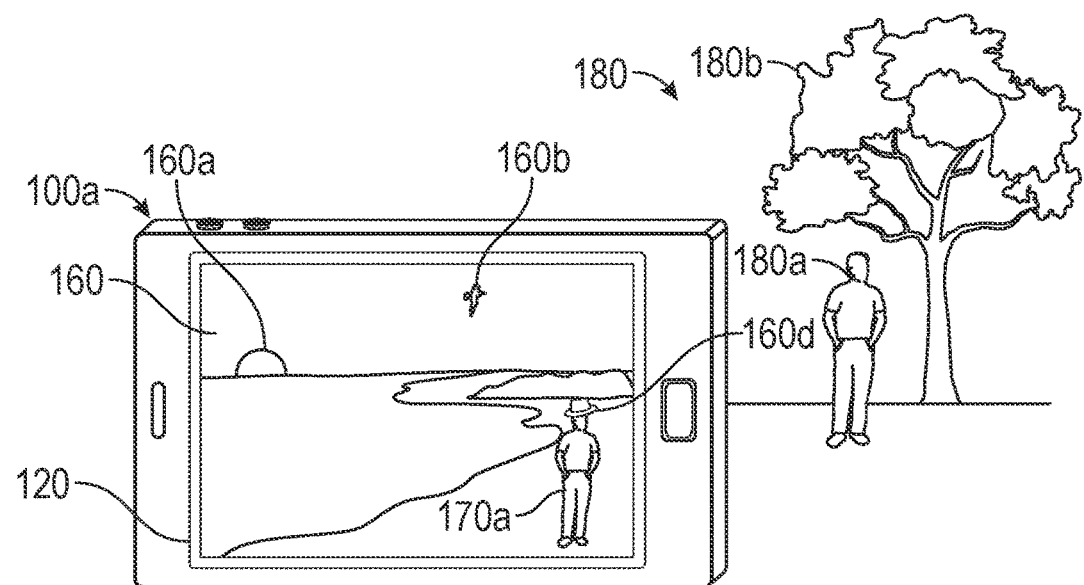

In some embodiments, system 100 is a mobile device, such as in the embodiments described with respect to device 100a in FIGS. 1C-1E. In some embodiments, system 100 is a head-mounted display (HMD) device, such as in the embodiments described with respect to device 100a in FIGS. 1F-1H. In some embodiments, system 100 is a wearable HUD device, such as in the embodiments described with respect to device 100a in FIG. H.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 optionally includes image sensor(s) 124. Image sensor(s) 124 are similar to image sensors(s) 108, except that image sensor(s) 124 are oriented in a direction opposite to image sensor(s) 108. For example, image sensor(s) 108 and image sensor(s) 124 are disposed on opposite sides of device 100*a* or 100*c*. In some examples, image sensor(s) 124 obtain images of the user while image sensor(s) 108 obtain images of physical objects in the user's line-of-sight.

In some embodiments, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

FIGS. 1C-1E illustrate examples of system 100 in the form of device 100*a*. In FIGS. 1C-1E, device 100*a* is a mobile device, such as a cellular phone. FIG. 1C illustrates device 100*a* carrying out a virtual reality technique. Device 100*a* is displaying, on display 120, a virtual environment 160 that includes virtual objects, such as sun 160*a*, birds 160*b*, and beach 160*c*. Both the displayed virtual environment 160 and virtual objects (e.g., 160*a*, 160*b*, 160*c*) of the virtual environment 160 are computer-generated imagery. Note that the virtual reality environment depicted in FIG. 1C does not include representations of physical objects from the real environment 180, such as physical person 180*a* and physical tree 180*b*, even though these elements of real environment 180 are within the field of view of image sensor(s) 108 of device 100*a*.

FIG. 1D illustrates device 100*a* carrying out a mixed reality technique, and in particular an augmented reality technique, using pass-through video. Device 100*a* is displaying, on display 120, a representation 170 of the real environment 180 with virtual objects. The representation 170 of the real environment 180 includes representation 170*a* of person 180*a* and representation 170*b* of tree 180*b*. For example, the device uses image sensor(s) 108 to capture images of the real environment 180 that are passed through for display on display 120. Device 100*a* overlays hat 160*d*, which is a virtual object generated by device 100*a*, on the head of the representation 170*a* of person 180*a*. Device 100*a* tracks the location and/or orientation of physical objects with respect to the position and/or orientation of device 100*a* to enable virtual objects to interact with physical objects from the real environment in the augmented reality environment. In this example, device 100*a* accounts for movements of device 100*a* and person 180*a* to display hat 160*d* as being on the head of the representation 170*a* of person 180*a*, even as device 100*a* and person 180*a* move relative to one another.

FIG. 1E illustrates device 100*a* carrying out a mixed reality technique, and in particular an augmented virtuality technique. Device 100*a* is displaying, on display 120, a virtual environment 160 with representations of physical objects. The virtual environment 160 includes virtual objects (e.g., sun 160*a*, birds 160*b*) and representation 170*a* of person 180*a*. For example, device 100*a* uses image sensor(s) 108 to capture images of person 180*a* in real environment 180. Device 100*a* places representation 170*a* of person 180*a* in virtual environment 160 for display on display 120. Device 100*a* optionally tracks the location and/or orientation of physical objects with respect to the position and/or orientation of device 100*a* to enable virtual objects to interact with physical objects from real environment 180. In this example, device 100*a* accounts for movements of device 100*a* and person 180*a* to display hat 160*d* as being on the head of representation 170*a* of person 180*a*. Notably, in this example, device 100*a* does not display a representation of tree 180*b* even though tree 180*b* is also within the field of view of the image sensor(s) of device 100*a*, in carrying out the mixed reality technique.

Figure 1F:
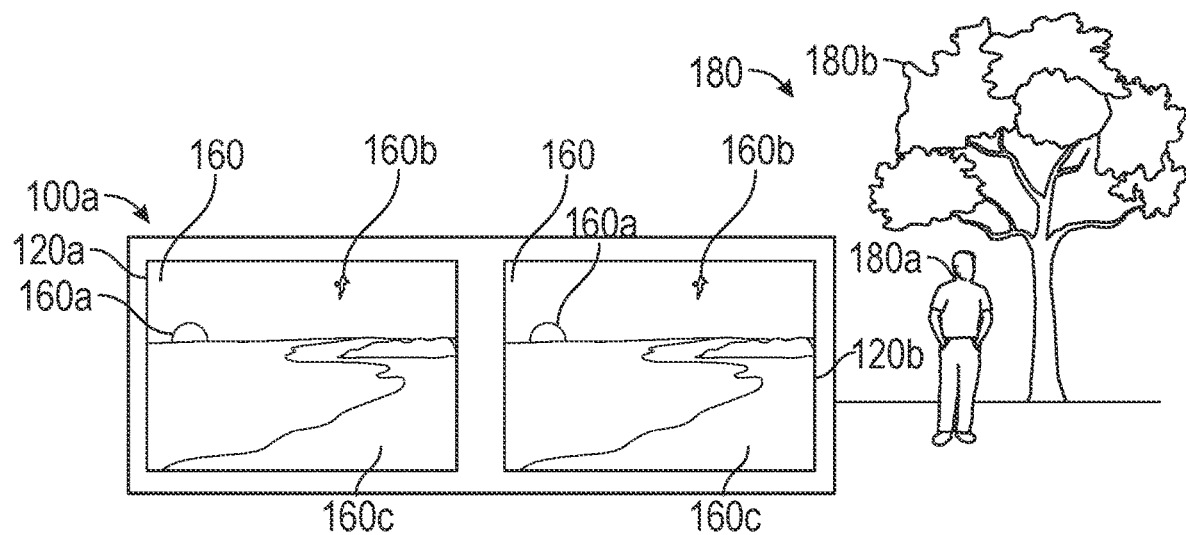
FIGS. 1F-1H illustrate examples of the system in the form of head-mounted display devices.
Figure 1G:
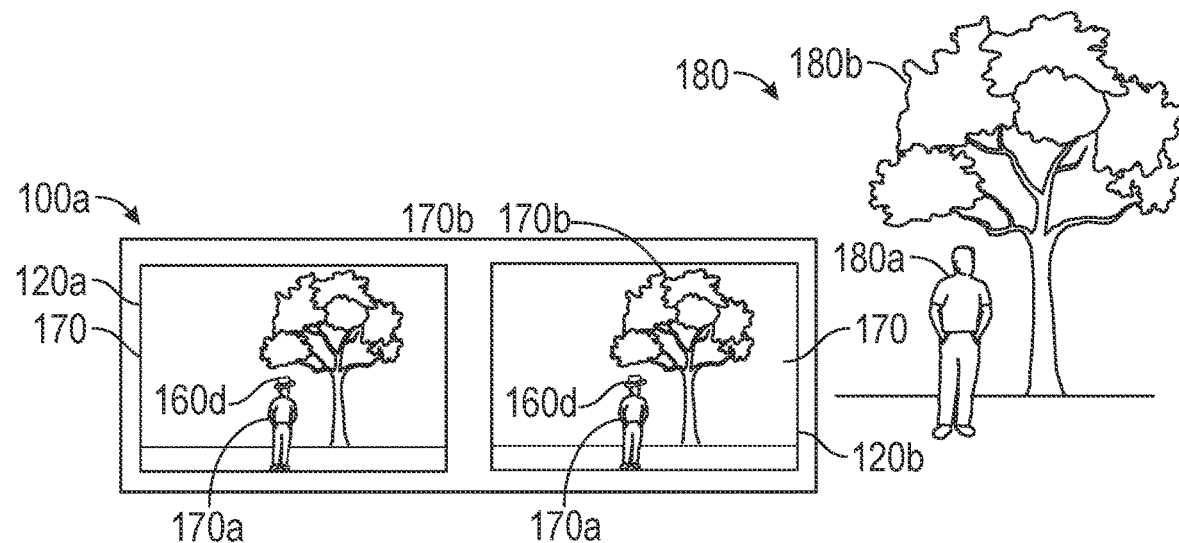
Figure 1H:
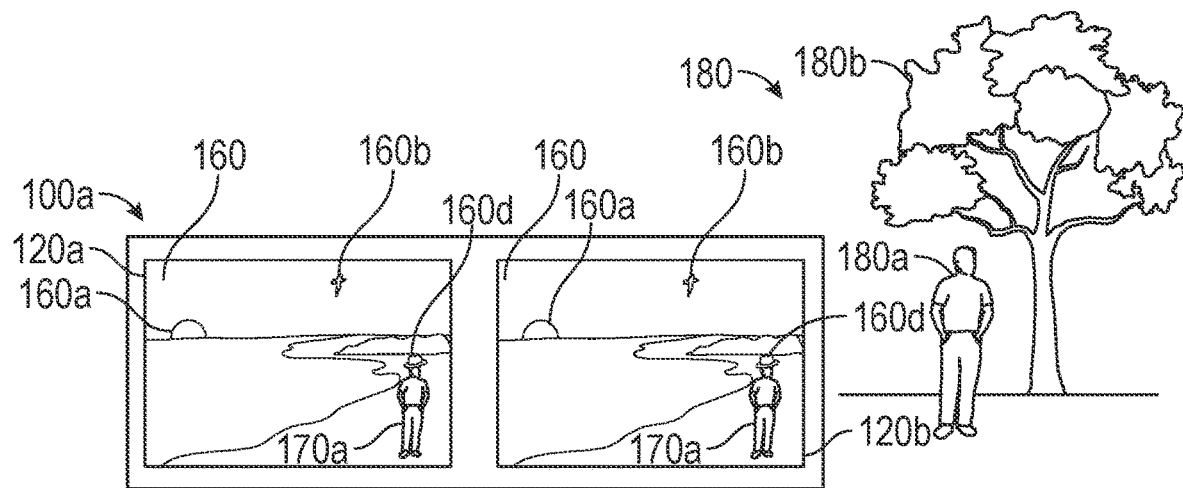

FIGS. 1F-1H illustrate examples of system 100 in the form of device 100*a*. In FIGS. 1F-1H, device 100*a* is a HMD device configured to be worn on the head of a user, with each eye of the user viewing a respective display 120*a* and 120*b*. FIG. 1F illustrates device 100*a* carrying out a virtual reality technique. Device 100*a* is displaying, on displays 120*a* and 120*b*, a virtual environment 160 that includes virtual objects, such as sun 160*a*, birds 160*b*, and beach 160*c*. The displayed virtual environment 160 and virtual objects (e.g., 160*a*, 160*b*, 160*c*) are computer-generated imagery. In this example, device 100*a* simultaneously displays corresponding images on display 120*a* and display 120*b*. The corresponding images include the same virtual environment 160 and virtual objects (e.g., 160*a*, 160*b*, 160*c*) from different viewpoints, resulting in a parallax effect that provides a user with the illusion of depth of the objects on the displays. Note that the virtual reality environment depicted in FIG. 1F does not include representations of physical objects from the real environment, such as person 180*a* and tree 180*b* even though person 180*a* and tree 180*b* are within the field of view of the image sensor(s) of device 100*a*, in carrying out the virtual reality technique.

FIG. 1G illustrates device 100*a* carrying out an augmented reality technique using pass-through video. Device 100*a* is displaying, on displays 120*a* and 120*b*, a representation 170 of real environment 180 with virtual objects. The representation 170 of real environment 180 includes representation 170*a* of person 180*a* and representation 170*b* of tree 180*b*. For example, device 100*a* uses image sensor(s) 108 to capture images of the real environment 180 that are passed through for display on displays 120*a* and 120*b*. Device 100*a* is overlaying a computer-generated hat 160*d* (a virtual object) on the head of representation 170*a* of person 180*a* for display on each of displays 120*a* and 120*b*. Device 100*a* tracks the location and/or orientation of physical objects with respect to the position and/or orientation of device 100*a* to enable virtual objects to interact with physical objects from real environment 180. In this example, device 100*a* accounts for movements of device 100*a* and person 180*a* to display hat 160*d* as being on the head of representation 170*a* of person 180*a*.

FIG. 1H illustrates device 100*a* carrying out a mixed reality technique, and in particular an augmented virtuality technique, using pass-through video. Device 100*a* is displaying, on displays 120*a* and 120*b*, a virtual environment 160 with representations of physical objects. The virtual environment 160 includes virtual objects (e.g., sun 160*a*, birds 160*b*) and representation 170*a* of person 180*a*. For example, device 100*a* uses image sensor(s) 108 to capture images of person 180*a*. Device 100*a* places the representation 170*a* of the person 180*a* in the virtual environment for display on displays 120*a* and 120*b*. Device 100*a* optionally tracks the location and/or orientation of physical objects with respect to the position and/or orientation of device 100*a* to enable virtual objects to interact with physical objects from real environment 180. In this example, device 100*a* accounts for movements of device 100*a* and person 180*a* to display hat 160d as being on the head of the representation 170a of person 180a. Notably, in this example, device 100a does not display a representation of tree 180b even though tree 180b is also within the field of view of the image sensor(s) 108 of device 100a, in carrying out the mixed reality technique.

Figure 1I:
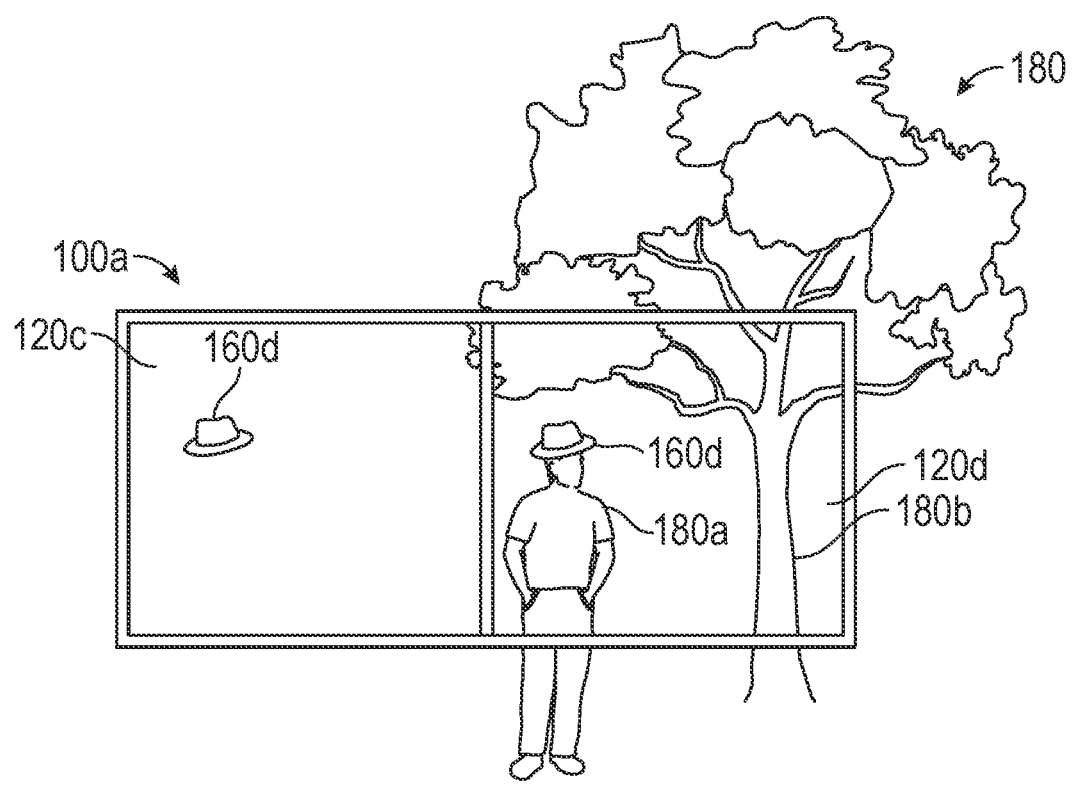
FIG. 1I illustrates an example of the system in the form of a head-up display device.

FIG. 1I illustrates an example of system 100 in the form of device 100a. In FIG. 1I, device 100a is a HUD device (e.g., a glasses device) configured to be worn on the head of a user, with each eye of the user viewing a respective heads-up display 120c and 120d. FIG. 1I illustrates device 100a carrying out an augmented reality technique using heads-up displays 120c and 120d. The heads-up displays 120c and 120d are (at least partially) transparent displays, thus allowing the user to view the real environment 180 in combination with heads-up displays 120c and 120d. Device 100a is displaying, on each of heads-up displays 120c and 120d, a virtual hat 160d (a virtual object). The device 100a tracks the location and/or orientation of physical objects in the real environment with respect to the position and/or orientation of device 100a and with respect to the position of the user's eyes to enable virtual objects to interact with physical objects from real environment 180. In this example, device 100a accounts for movements of device 100a, movements of the user's eyes with respect to device 100a, and movements of person 180a to display hat 160d at locations on displays 120c and 120d such that it appears to the user that the hat 160d is on the head of person 180a.

Figure 2:
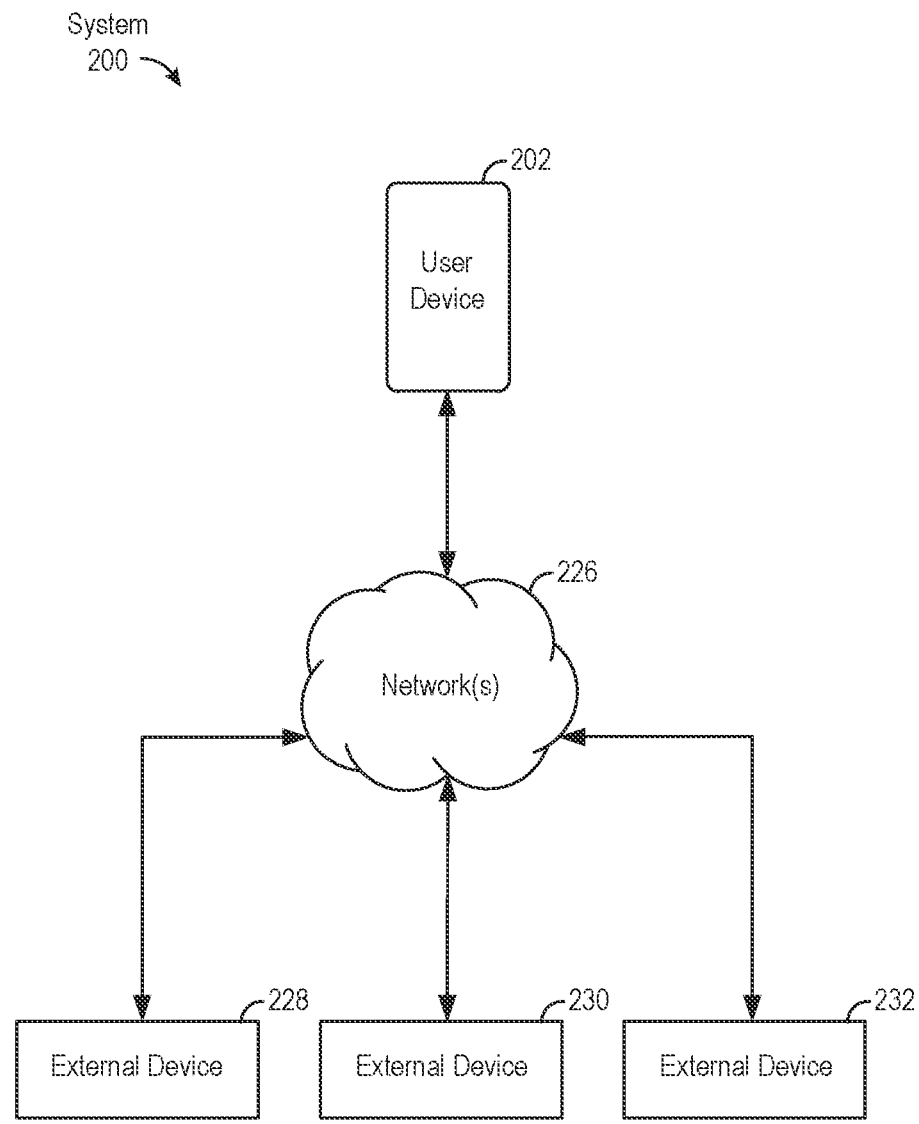
FIG. 2 depicts an exemplary system for implementing various techniques of controlling an external device using a reality interface.

FIG. 2 depicts exemplary system 200 for implementing various techniques of controlling an external device using a reality interface. System 200 includes user device 202 configured to interact with external devices 228, 230, and 232. User device 202 is similar to or the same as one or more of devices 100a, b, or c in system 100 (FIGS. 1A-1B). In some embodiments, user device 202 is configured to interact with external devices 228, 230, and 232 via a wireless communication connection. The wireless communication connection is established, for example, via one or more networks 226. Network(s) 226 can include a Wi-Fi' network or any other wired or wireless public or private local network. Additionally or alternatively, user device 202 establishes a wireless communication connection directly with external devices 228, 230, or 232 using, for example, a short-range communication protocol, Bluetooth™, line of sight, peer-to-peer, or another radio-based or other wireless communication. Thus, in the illustrated embodiment, user device 202 can be located near external devices 228, 230, and 232, such that it communicates with them directly or over the same local network. For example, user device 202 and external devices 228, 230, and 232 are located within the same physical environment (e.g., room of a home or building), and network(s) 226 include the home or building's Wi-Fi™ network. External devices 228, 230, and 232 can include any type of remotely controlled external device, such as a light bulb, garage door, door lock, thermostat, audio player, television, or the like.

Figure 3A:
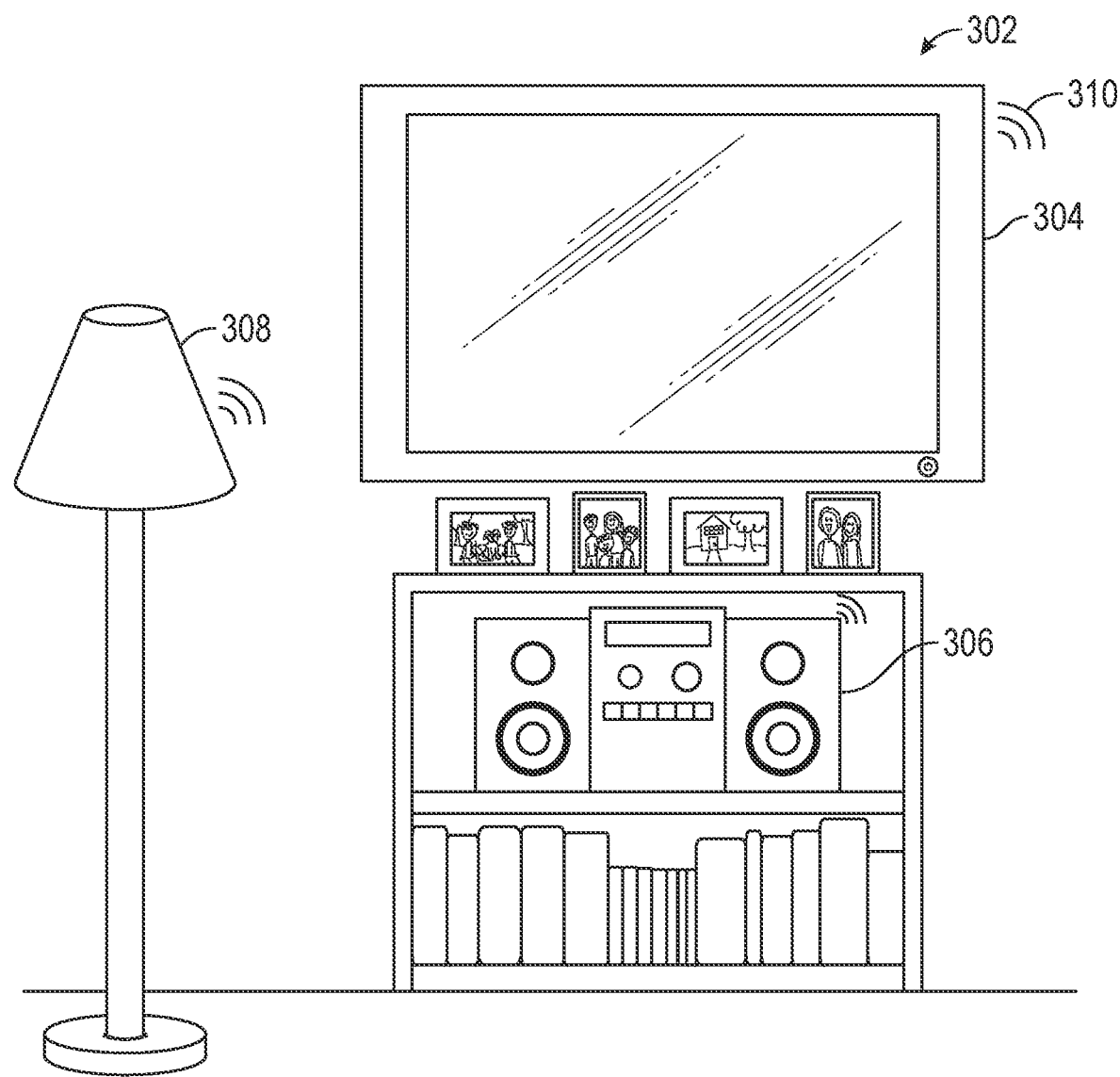
FIG. 3A depicts a physical environment that includes external devices.

With reference now to FIGS. 3A-3D, exemplary techniques for controlling an external device using a reality interface are described. FIG. 3A depicts physical environment 302 that includes external devices 304, 306, and 308. Physical environment 302 is, for example, the physical environment of the user. For instance, the user can be sitting in his living room and physical environment 302 is at least a portion of the user's living room that is directly in front of the user. The user may wish to control one of external devices 304, 306, and 308. As described in greater detail below, the user can utilize a reality interface provided by the user's device (e.g., user device 312) to control one of external devices 304, 306, and 308.

Figure 3B:
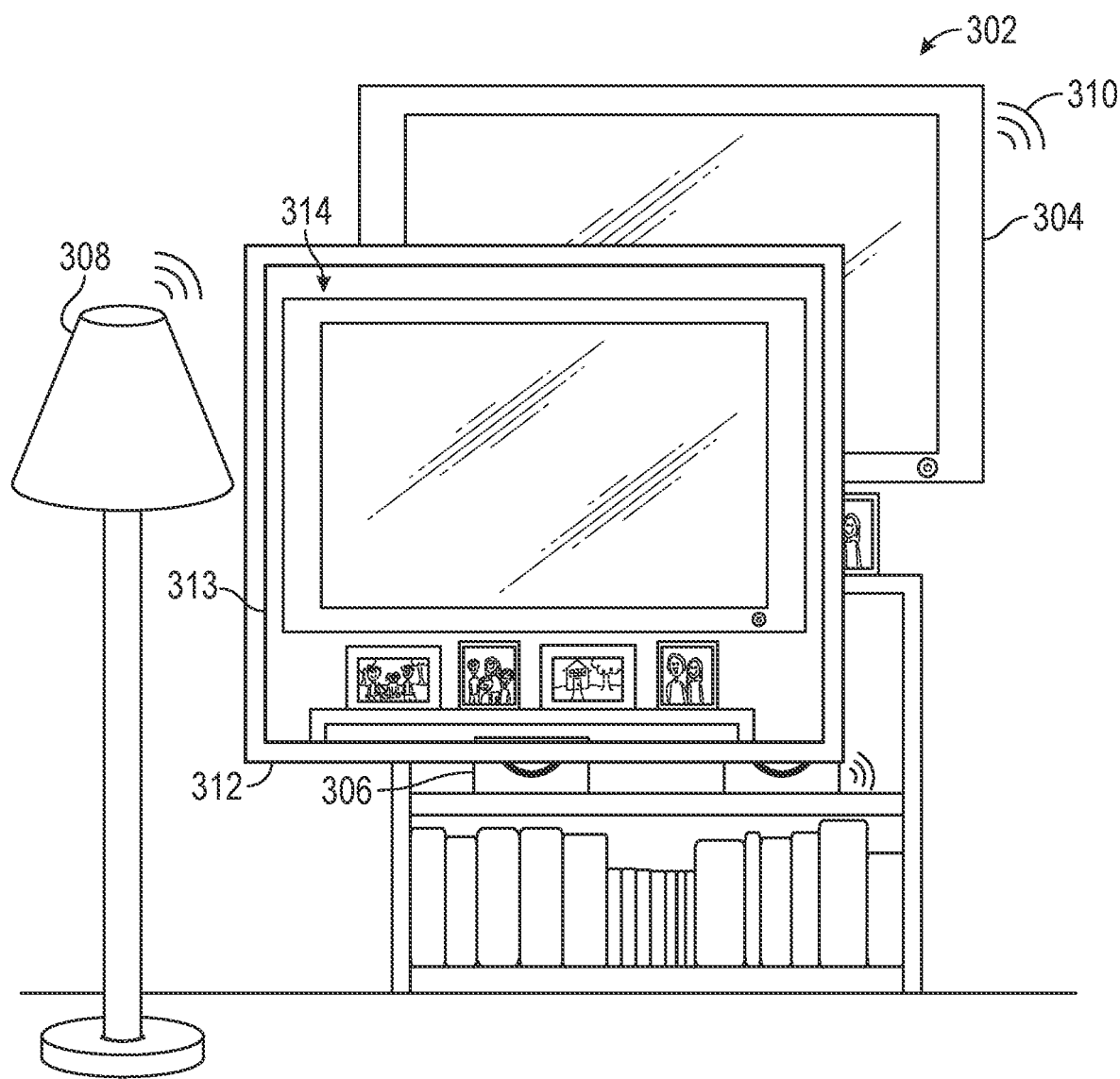
FIG. 3B depicts a user device displaying a reality interface with a representation of a physical environment.

FIG. 3B depicts user device 312 displaying representation 314 of physical environment 302. In the present embodiment, user device 312 is a standalone device (e.g., device 100a), such as a hand-held mobile device or a standalone head-mounted device. It should be recognized that, in other embodiments, user device 312 is communicatively coupled to another device, such as a base station device. For example, user device 312 can be a head-mounted display device (e.g., device 100c) that is communicatively coupled to another device (e.g., device 100b), such as a base station device containing a CPU. In these embodiments, the operations described below for accessing a function of an external device through a reality interface can be divided up in any manner between user device 312 and the other device.

Further, in the present embodiment, display 313 of user device 312 is opaque where the user is unable to see physical environment 302 through display 313. For example, visible light emitted or reflected from physical objects of physical environment 302 is unable to substantially transmit (e.g., less than 5% transmission) through display 313. In other embodiments, display 313 is transparent where the user is able to see physical environment 302 through display 313. For example, visible light emitted or reflected from physical objects of physical environment 302 is able to substantially transmit (e.g., greater than 40% transmission) through display 313. In one embodiment, display 313 is a transparent LCD (liquid-crystal display) or LED (light emitting diode) display. In another embodiment, user device 312 is a pair of see-through near-eye glasses with integrated displays.

User device 312 is configured to provide a reality interface. The reality interface is used, for example, to control one of external devices 304, 306, and 308. External devices 304, 306, and 308 are similar to external devices 228, 230, and 232 of FIG. 2, described above. In particular, external devices 304, 306, and 308 are devices that are capable of being wirelessly controlled by user device 312. For example, external device 304 is a television having functions such as power on/off, volume, channel, closed caption, or the like. External device 306 is an audio system having functions such as power on/off, volume, radio tuning, playlist selection, or the like. External device 308 is a lamp having functions such as on/off and brightness adjustment (e.g., dimming). Each of these exemplary functions of external devices 304, 306, and 308 are configured to be controlled using the reality interface provided by user device 312. While only three external devices 304, 306, and 308 are shown, it should be appreciated that, in other embodiments, the physical environment can include any number of external devices.

User device 312 detects external devices 304, 306, and 308 in physical environment 302. In this embodiment, the detection is based on wireless communication (as depicted by lines 310 in FIG. 3B) between user device 312 and external devices 304, 306, and 308. The wireless communication is, for example, near-field or short-range wireless communication (e.g., NFC, Bluetooth™, etc.). User device 312 detects external devices 304, 306, and 308 upon receiving, via wireless communication, information from external devices 304, 306, and 308. In some embodiments, user device 312 transmits a request and/or broadcasts an inquiry (e.g., discovery signal) to cause external devices 304, 306, and 308 to transmit the information. In some embodiments, user device 312 transmits the request and/or broadcasts the inquiry responsive to a determination that external devices are probable (e.g., above a threshold of confidence) in the field of view of image sensors of user device 312. In other embodiments, external devices 304, 306, and 308 automatically broadcast the information periodically independent of any inquiry from user device 312. User device 312 detects external devices 304, 306, and 308 upon receiving the information from external devices 304, 306, and 308 via wireless communication. For example, based on the received information, user device 312 recognizes that external devices 304, 306, and 308 are proximate to (e.g., within communication range) user device 312. In some embodiments, the received information includes information identifying external devices 304, 306, and 308, such as a device identifier. In some embodiments, the received information specify one or more functions of external devices 304, 306, and 308.

In some embodiments, in response to detecting external devices 304, 306, and 308, user device 312 establishes wireless communication connections (e.g., near-field or short range direct wireless communication connections) with one or more of external devices 304, 306, and 308. The wireless communication connections are, for example, wireless network connections (e.g., connections via a Wi-Fi™ network). In some embodiments, the wireless communication connections are direct peer-to-peer wireless communication connections (e.g., Bluetooth™ connections) that each enable single-hop point-to-point communications across a secure wireless communication channel. For example, user device 312 obtains connection information (e.g., connection addresses, authentication information, etc.) associated with one or more of external devices 304, 306, and 308 and uses the connection information to establish the wireless communication connections with one or more of external devices 304, 306, and 308. In some embodiments, after establishing the wireless communication connection(s), user device 312 receives information from one or more of external devices 304, 306, and 308 over the wireless communication connection(s). The received information specifies, for example, one or more functions of external devices 304, 306, and 308. In the present embodiments, user device 312 establishes a wireless communication connection with external device 304 and receives information from external device 304 over the established wireless communication connection indicating that external device 304 has a power ON/OFF function.

User device 312 obtains first image data of physical environment 302. For example, one or more image sensors (e.g., image sensors 108) of user device 312 captures the first image data of physical environment 302. The first image data includes, for example, images and/or videos of physical environment 302 captured by the image sensor(s). Specifically, in one embodiment, the first image data includes a live video preview of at least a portion of the physical environment captured by the image sensor(s). User device 312 generates representation 314 of physical environment 302 according to the obtained first image data. In some embodiments, the representation includes at least a portion of the live video preview captured by the image sensor(s). In some embodiments, captured images and/or videos of physical environment 302 are assembled to compose representation 314 of physical environment 302.

As shown in FIG. 3B, user device 312 displays, on display 313, representation 314 of physical environment 302 as part of the reality interface provided by user device 312. In the present embodiment, the field of view provided by representation 314 represents only a portion of physical environment 302 observed from a line-of-sight position of the user. In particular, representation 314 includes a representation of external device 304 (which is within the field of view of image sensors on device 312) but not representations of external devices 306 and 308. It should be recognized that in other embodiments, the field of view can vary. The field of view displayed by user device 312 varies, for example, based on a determined gaze direction of the user. Further, in embodiments where display 313 is transparent, it should be recognized that representation 314 of physical environment 302 is not displayed on user device 312. Instead, a direct view of physical environment 302 is visible to the user as a result of light emitted or reflected from physical environment 302 being transmitted through display 313 into the user's eyes.

Figure 3C:
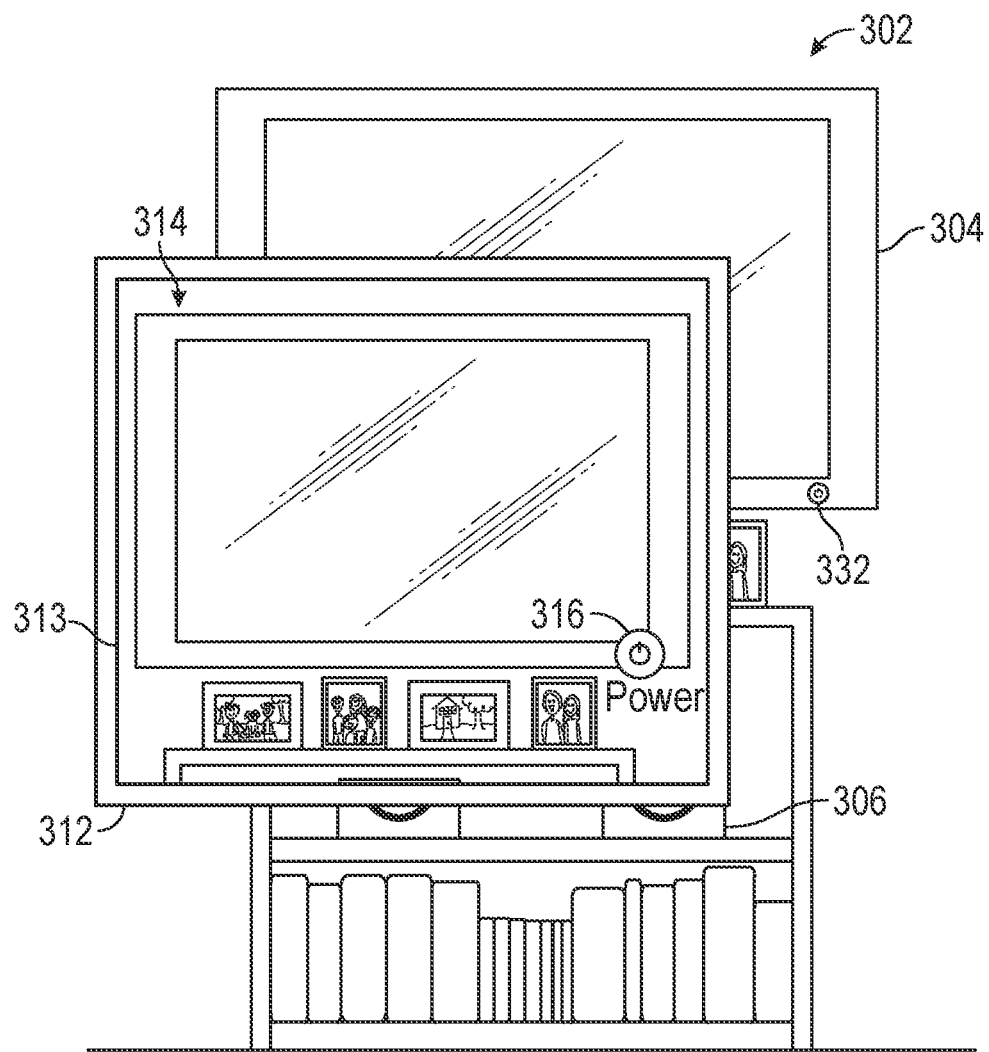
FIG. 3C depicts a user device concurrently displaying, in a reality interface, a representation of a physical environment and an affordance corresponding to a function of an external device in the physical environment.

With reference to FIG. 3C, user device 312 concurrently displays, on its display 313, representation 314 of physical environment 302 and affordance 316 corresponding to a function of external device 304 (e.g., power ON/OFF function of external device 304). Affordance 316 is a virtual object that does not exist in physical environment 302, even though the function of affordance 316 is analogous that of physical power button 332. In the present embodiment, the function represented by affordance 316 is the same function specified in the information received from external device 304. Affordance 316, when activated by the user, causes external device 312 to turn external device 304 either on (if external device 304 is off) or off (if external device 304 is on). Accordingly, affordance 316 enables the user to control the power ON/OFF function of external device 304 using the reality interface provided by user device 312.

Figure 3D:
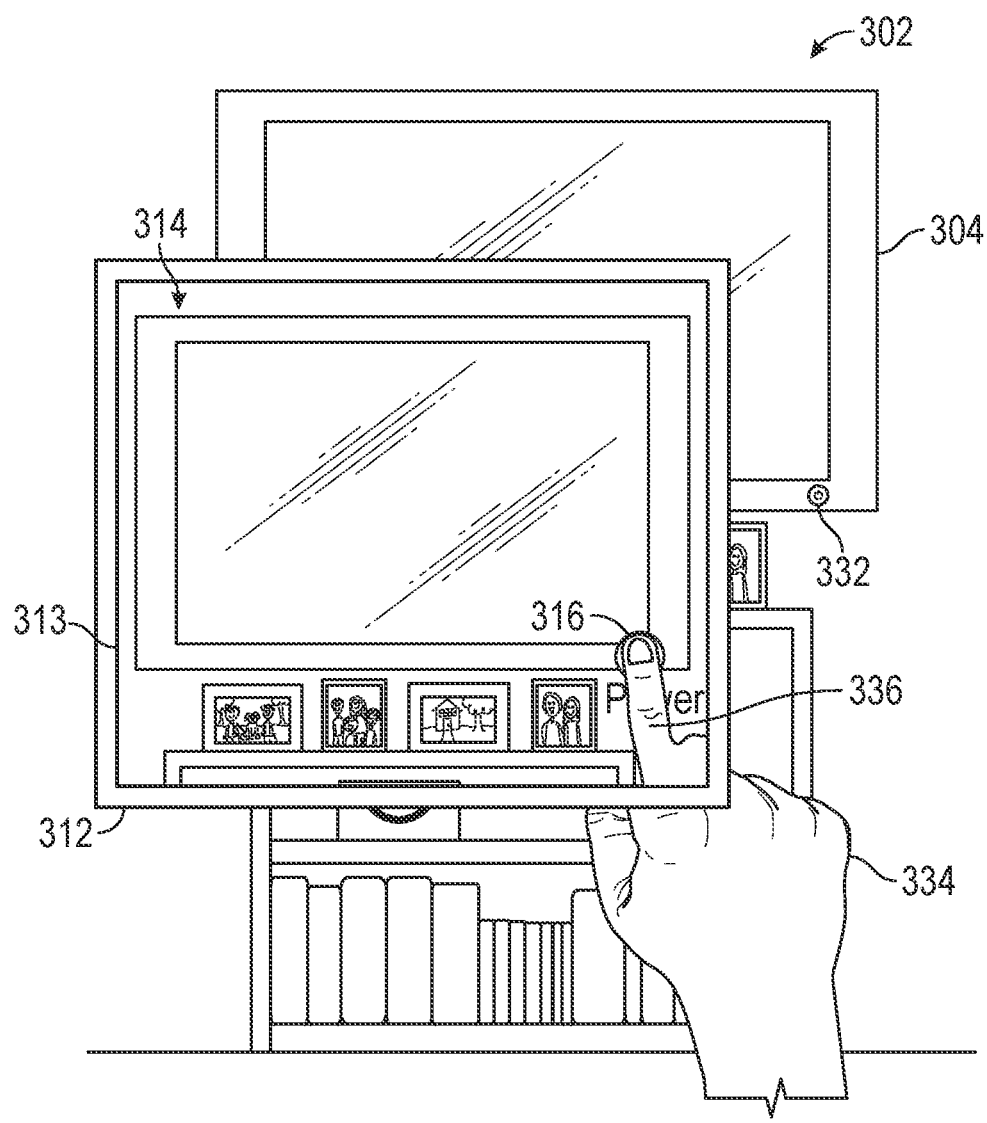
FIG. 3D depicts a user interacting with a reality interface of a user device by providing a gesture.

With reference to FIG. 3D, the user provides hand gesture 334 in a region between user device 312 and external device 304. In particular, the user interacts with the reality interface displayed on user device 312 using hand gesture 334. While displaying representation 314 of physical environment 302, user device 312 obtains second image data of hand gesture 334. For example, one or more image sensors (e.g., image sensor(s) 108) of user device 312 captures second image data of hand gesture 334 with physical environment 302 in the background. The second image data includes, for example, images and/or videos of hand gesture 334 captured by the image sensor(s). As shown in FIG. 3D, user device 312 displays representation 336 of hand gesture 334 according to the obtained second image data. In this embodiment, representation 336 of hand gesture 334 is displayed concurrently with representation 314 of physical environment 302 and affordance 316.

It should be recognized that, in embodiments where display 313 of user device 312 is transparent, affordance 316 is displayed on display 313 without needing to display a live image (e.g., representation 314) of physical environment 302 as the physical environment is directly visible to the user. Thus, from the perspective of the user, the displayed affordance appears to be overlaid on the physical environment visible in the background through the transparent display. In some embodiments, affordance 316 is displayed at a position on display 313 corresponding to external device 304 with respect to the gaze direction (e.g., line-of-sight) of the user's eyes. For example, affordance 316 is positioned on display 313 such that from the perspective of the user, the affordance appears to overlay at least part of the respective physical view of external device 304. Further, in these embodiments, representation 336 of hand gesture 334 is not displayed on display 313.

User device 312 determines, based on the second image data, whether hand gesture 334 satisfies one or more predetermined criteria associated with the power on/off function of external device 304. The determination establishes, for example, whether the user intends to cause external device 304 to perform the power ON/OFF function. For example, the determination includes determining whether hand gesture 334 activates affordance 316 to cause external device 304 to perform the power ON/OFF function. In some embodiments, the determination is performed by analyzing the hand gesture identified in the second image data and determining whether the identified hand gesture corresponds to a predetermined type of hand gesture associated with the power ON/OFF function. In some embodiments, image recognition is performed to determine whether the hand gesture identified in the second image data corresponds to a predetermined type of hand gesture. For example, user device 312 determines a similarity measure between portions of the second image data capturing hand gesture 334 and one or more stored images of a predetermined type of hand gesture associated with the power ON/OFF function. If the similarity measure is greater than a predetermined threshold, the hand gesture identified in the second image data is determined to correspond to a predetermined type of hand gesture associated with the power ON/OFF function. In these embodiments, hand gesture 334 is determined to satisfy one or more predetermined criteria associated with the power on/off function of external device 304. Conversely, if the similarity measure is not greater than a predetermined threshold, the hand gesture identified in the second image data is determined not to correspond to a predetermined type of hand gesture associated with the power ON/OFF function. In these embodiments, hand gesture 334 is determined not to satisfy one or more predetermined criteria associated with the power ON/OFF function of external device 304. As described in greater detail below, additional techniques, such as three-dimensional object recognition, machine learning, or the like can be used to determine whether hand gesture 334 satisfies one or more predetermined criteria associated with the power ON/OFF function of external device 304.

In accordance with determining that the hand gesture satisfies one or more predetermined criteria associated with the function, user device 312 causing external device 304 to perform the power ON/OFF function. For example, user device 312 sends a request to external device 304 over the established wireless communication connection to performed the power ON/OFF function. External device 304, upon receiving the request, either turns on (if external device 304 is off) or off (if external device 304 is on).

Figure 4A:
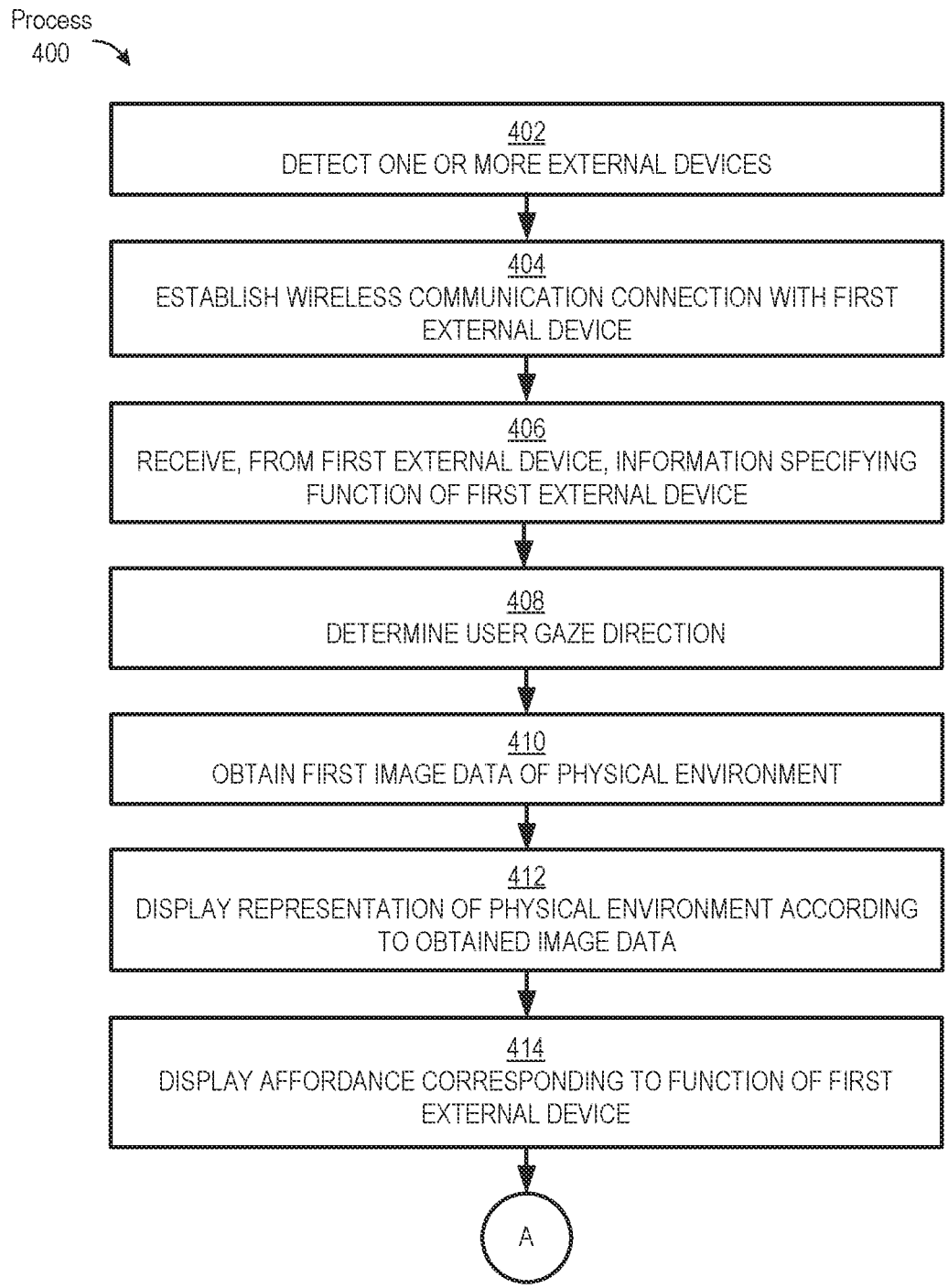
FIGS. 4A and 4B depict a flow chart of an exemplary process for controlling an external device using a reality interface.
Figure 4B:
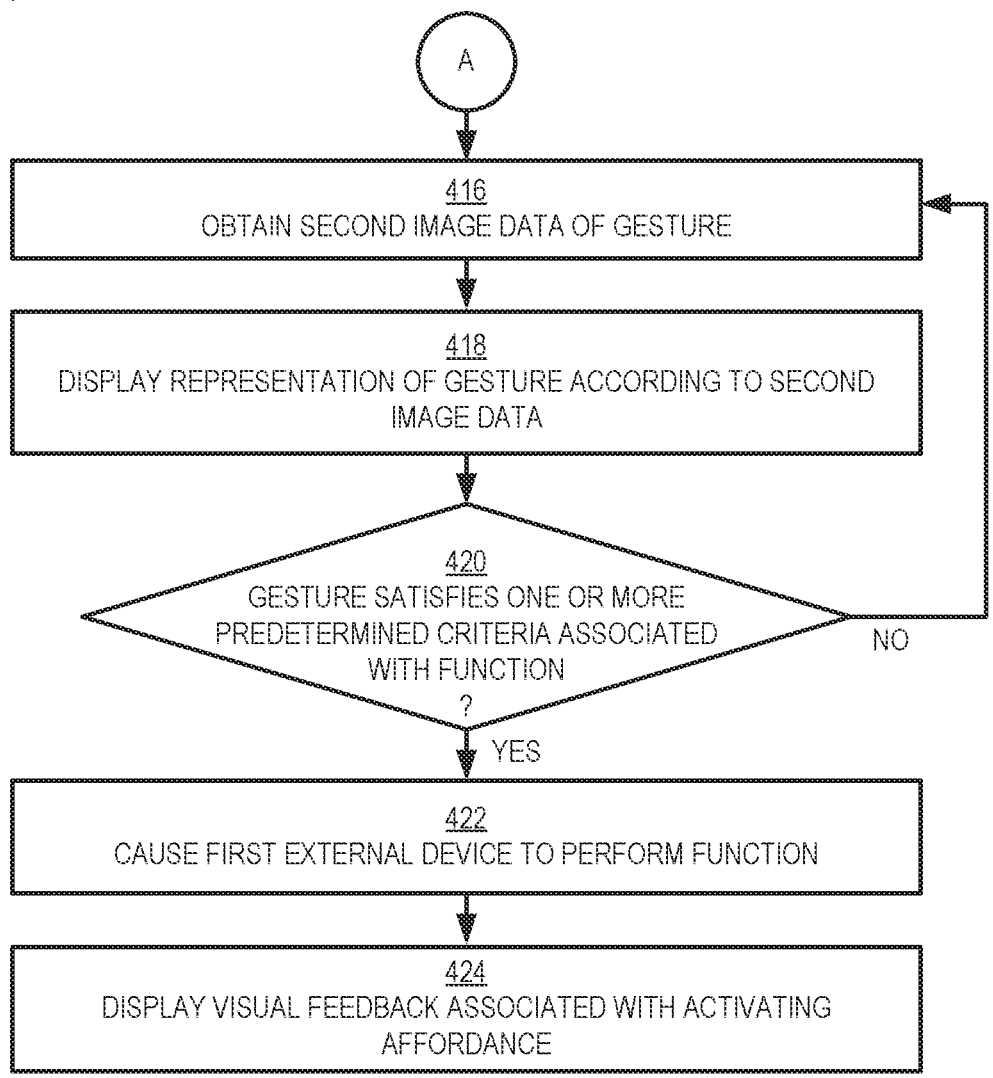

Turning now to FIGS. 4A-4B, a flow chart of exemplary process 400 for controlling an external device using a reality interface is depicted. In the description below, process 400 is described as being performed using a user device (e.g., device 100a). The user device is, for example, a handheld mobile device or a head-mounted device. It should be recognized that, in other embodiments, process 400 is performed using two or more electronic devices, such as a user device (e.g., device 100c) that is communicatively coupled to another device (e.g., device 100b), such as a base station device. In these embodiments, the operations of process 400 are distributed in any manner between the user device and the other device. Further, it should be appreciated that the display of the user device can be transparent or opaque. Although the blocks of process 400 are depicted in a particular order in FIGS. 4A-4B, it should be appreciated that these blocks can be performed in any order. Further, one or more blocks of process 400 can be optional and/or additional blocks can be performed.

At block 402, one or more external devices (e.g., external devices 304, 306, and 308) of a physical environment (e.g., physical environment 302) are detected. In some embodiments, the detection is based on wireless communication (e.g., near-field or short-range wireless communication, such as Bluetooth™ or Wi-Fi Direct™) between the user device and the one or more external devices. Specifically, the user device detects one or more external devices that are within wireless range (e.g., within a predetermined distance) of the user device. In one embodiment, the user device wirelessly transmits (e.g., broadcasts) a request and/or an inquiry signal that is received by the one or more external devices in the physical environment. The inquiry signal, when received by the one or more external devices, causes the one or more external devices to send a response to the user device. In this embodiment, the user device detects the one or more external devices upon receiving the response from the one or more external devices. In some embodiments, the response includes identification information, such as an identifier for each respective external device of the one or more external devices. The identifier is, for example, a sequence of characters that represents the respective external device. It should be appreciated that, in some embodiments, additional information is included in the response.

In some embodiments, each of the one or more external devices wirelessly broadcasts information into the surrounding region. For example, the one or more external devices automatically broadcasts information periodically and independent of any inquiry signal from the user device. In these embodiments, the user device detects the one or more external devices upon receiving the broadcasted information.

At block 404, a wireless communication connection is established with a first external device of the one or more external devices. For example, a wireless communication connection is established between the user device and the first external device. In some embodiments, the wireless communication connection is a near-field or short range wireless communication connection (e.g., Bluetooth™, Wi-Fi Direct™, etc.). In some embodiments, the wireless communication connection is a direct (e.g., peer-to-peer) wireless communication connection between the user device and the first external device. The wireless communication connection enables, for example, single-hop point-to-point wireless communication between the user device and the first external device. In some embodiments, block 404 is performed in response to detecting the first external device at block 402. In these embodiments, upon detecting the first external device, the user device initiates the connection process that establishes the wireless communication connection between the user device and the first external device. In some embodiments, block 404 is performed prior to block 406.

The process for establishing the wireless communication connection includes, for example, exchanging connection information between the user device and the first external device. In some embodiments, the user device and/or first external device are pre-authorized to establish a wireless communication connection. For example, the user devices and first external device previously (e.g., prior to block 402) exchanged authentication information (e.g., pairing information) and thus the wireless communication connection is established without exchanging authentication information at block 404. In other embodiments, the user device and/or first external device require authorization to establish the wireless communication connection. In these embodiments, the process for establishing the wireless communication connection includes exchanging authentication information (e.g., via pairing) between the user device and the first external device and using the exchanged authentication information to establish the wireless communication connection.

At block 406, information specifying a function of the first external device is received from the first external device. In some embodiments, the information specifying a function of the first external device is received over the wireless communication connection established at block 404. For example, the first external device automatically sends the information to the user device upon establishing the wireless communication connection. Alternatively, the user device requests for the information from the first external device and in response, the first external device sends the information to the user device over the established wireless communication connection. In some embodiments, the information is received at block 402 upon detecting the first external device of the one or more external devices. For example, the information is included in a response from the first external device to the inquiry signal broadcasted by the user device.

The specified function is, for example, any function that the first external device is capable of performing. In embodiments where the first external device is a television (e.g., external device 304 of FIGS. 3A-3D), the function is a power ON/OFF function, volume adjustment function, channel switching function, or the like. In embodiments where the first external device is a watch or clock, the function is, for example, a time function, alarm function, battery life function, or the like. In embodiments where the first external device is, for example, a phone, the function is an address book function, call function, voicemail playback function, or the like. In embodiments where the first external device is a personal computing device (e.g., tablet, laptop, etc.), the function is, for example, a message display function (e.g., email, text message, etc.) or web browsing function. In embodiments where the first external device is a media device, the function is, for example, a media search/browse function, media play function, media file transfer function, or the like. In embodiments where the first external device is a lighting device, the function is, for example, a power ON/OFF function, a dimmer function, or the like.

At block 408, a user gaze direction is determined. For example, image data of the user is obtained using one or more first image sensors (e.g., image sensor(s) 124) of the user device. The one or more first image sensors are, for example directed at the user's eyes. In some embodiments, the one or more first image sensors include visible light image sensor(s) and/or IR sensor(s). The image data of the user includes, for example, image data (e.g., images and/or video) of the user's eyes. Using the image data of the user's eyes, the user gaze direction for each of the user's eyes is determined. For example, the center of the user's cornea, the center of the user's pupil, and the center of rotation of the user's eyeball are determined to determine the position of the visual axis of the user's eye. The visual axes of each of the user's eyes define the user gaze direction. The gaze direction can also be referred to as the gaze vector or line-of-sight. In some embodiments, determining the gaze direction includes determining the user's view position and the user's view angle with respect to the physical environment.

In some embodiments, the gaze direction is determined using depth information of the user. For example, depth information of the user's eyes is determined using the one or more first image sensors (e.g., using a depth sensor of the one or more first images sensors). The depth information is used, for example, to more accurately determine the center of the user's cornea, the center of the user's pupil, and the center of rotation of the user's eyeball.

In embodiments where the user device is a head-mounted device, data from other sensors of the user device is used to determine the gaze direction. For example, sensor data from a gyroscope and/or an accelerometer of the user device is obtained and used to determine the gaze direction. In some embodiments, three-dimensional positional tracking algorithms, such as visual inertial odometry, utilize the sensor data to determine the position and orientation of the user device as a proxy for the user's view position and view angle. In some embodiments, block 408 is performed while performing blocks 404 and/or 406.

At block 410, first image data of at least a portion of the physical environment is obtained. The physical environment includes the first external device. In some embodiments, the obtained first image data is captured by one or more second image sensors (e.g., image sensor(s) 108) of the user device. The one or more second image sensors include, for example visible light image sensor(s) or IR sensor(s). In some embodiments, the one or more second image sensors are directed at the physical environment in a direction opposite of the one or more first image sensors discussed in block 408. In some embodiments, the first image data substantially corresponds to a portion of the physical environment observed from a line-of-sight position of the user. In some embodiments, the first image data includes a sequence of images and/or a video preview of the physical environment captured by the second image sensor(s). The physical environment is any physical environment surrounding the user or the user device. For example, the physical environment includes a region of the user's home (e.g., kitchen, living room, bedroom, garage, etc.), a part of the user's workplace environment (e.g., office, conference room, lobby, etc.), a school environment (e.g., classroom), or a public environment (e.g., restaurant, library, etc.).

It should be appreciated that, in some embodiments, additional data of the at least a portion of the physical environment is obtained at block 410 using the one or more second image sensors. For example, first depth information of the at least a portion of the physical environment is obtained using the one or more second image sensors (e.g., a depth sensor or IR sensor of image sensor(s) 108). The first depth information is used, for example, to generate a three-dimensional representation of the physical environment. In some embodiments, generating the three-dimensional representation of the physical environment includes generating a depth map of the physical environment. Each pixel of the depth map is associated with respective distance information between the one or more second image sensors and a surface of the physical environment represented by the respective pixel.

In some embodiments, the first depth information is obtained using time-of-flight analysis. Specifically, an IR light source (e.g., IR emitter) of the user device emits IR light onto the physical environment and the IR sensor of the one or more second image sensors detects the backscattered light from the surfaces of objects in the physical environment. In some embodiments, the emitted IR light is an IR light pulse and the time between emitting the IR light pulse and detecting the corresponding backscattered light pulse is measured to determine the physical distance from the IR sensor to the surfaces of objects in the physical environment.

In some embodiments, the first depth information is obtained by projecting a light pattern onto the physical environment using a light source (e.g., visible or invisible light source). The light pattern is, for example, a grid of dots or lines with known spacing. The projected light pattern is then captured using a image sensor (e.g., light sensor, such as an image sensor or IR sensor). The deformation of the projected light pattern on the surfaces of one or more objects in the physical environment is used to determine the physical distance between the IR sensor and the surfaces of one or more objects in the physical environment.

In some embodiments, the first depth information is obtained using the first image data of the physical environment captured using two of the second image sensors spaced a known distance apart. The two image sensors capture first image data of the physical environment. In these embodiments, the first depth information of the physical environment is determined by the stereo effect of the two image sensors. Specifically, the distance offsets (e.g., parallax difference) between common objects in the captured first image data of the two image sensors are used to determine the first depth information of the physical environment.

In some embodiments, the first depth information is obtained using the first image data of the physical environment captured using one image sensor. For example, visual inertial odometry (VIO) techniques are applied to the image data to determine the first depth information.

At block 412, a representation (e.g., representation 314) of the physical environment is displayed on a display (e.g., display 120) according to the obtained first image data of block 410. The representation of the physical environment is part of the reality interface provided by the user device and is created using the obtained image data. In particular, the representation of the physical environment includes representations of physical objects (e.g., external device 304) in the physical environment. In some embodiments, the representation of the physical environment comprises a live video preview of the physical environment captured by the second image sensor(s). In some embodiments, the image characteristics (e.g., contrast, brightness, shading, etc.) of the live video preview are not substantially modified. Alternatively, the image characteristics of the live video preview are modified to improve image clarity or to emphasize relevant features in the reality environment. In some embodiments, the representation of the physical environment is a generated virtual environment corresponding to the physical environment.

In some embodiments, the representation of the physical environment is displayed based on the determined gaze direction of block 408. For example, the field of view of the displayed representation of the physical environment can vary according to the determined gaze direction. The view angle and view position corresponding to the representation of the physical environment can also vary according to the determined gaze direction.

In some embodiments, blocks 408 and 410 are performed prior to block 412. Further, in some embodiments, blocks 408 and 410 are performed while displaying the representation of the physical environment at block 406. In embodiments where process 400 is performed using a user device having a transparent display, block 412 is optional.

At block 414, an affordance (e.g., affordance 316) corresponding to the function of the first external device (e.g., the function specified in the information received at block 406) is displayed on the display (display 120). As used herein, the term "affordance" refers to a user-interactive graphical user interface object. For example, an image or a virtual button each optionally constitute an affordance. The displayed affordance is generated by the user device and does not exist in the physical environment. In some embodiments, the affordance is concurrently displayed with the representation of the physical environment (block 410)

In some embodiments, the affordance is displayed at a position in the representation of the physical environment corresponding to the first external device. For example, as shown in FIG. 3C, affordance 316 is displayed at a position overlapping a portion of the representation of the first external device. In some embodiments, the affordance is displayed at a position corresponding to a portion of the first external device that corresponds to the function specified in the information received at block 406. In these embodiments, block 416 includes determining, based on the first image data, whether the first external device includes a physical interface (e.g., button, switch, etc.) configured to perform the function. Upon determining that the first external device includes a physical interface configured to perform the function, the affordance is displayed in the displayed representation of the physical environment at a position corresponding to the physical interface of the external device. For example, as shown in FIG. 3C, affordance 316 is displayed at a position corresponding to the physical power ON/OFF button 332 of external device 304

The affordance is configured such that detecting a user activation of the displayed affordance causes the first external device to perform an action corresponding to the function. For example, in response to detecting user activation of the displayed affordance, the user device sends instructions to the first external device (e.g., via the established wireless communication connection of block 404), which when received by the first external device, causes the first external device to perform the function.

In some embodiments, prior to displaying the affordance, block 416 includes determining the affordance from a plurality of candidate affordances based on information received from the first external device. The determination is based on, for example, the function specified in the information received at block 406. In these embodiments, the affordance corresponding to the specified function is selected from a plurality of candidate affordances and displayed on the display.

It should be recognized that, in embodiments where process 400 is performed using a user device having a transparent display, the affordance corresponding to a function of the first external device is displayed on the transparent display without displaying the representation of the physical environment. Thus, from the perspective of the user, the displayed affordance appears to be overlaid on the physical environment visible in the background through the transparent display. In some embodiments, the affordance is displayed at a position on the transparent display corresponding to the first external device and with respect to the gaze direction (e.g., line-of-sight) of the user's eyes. For example, the affordance is positioned on the transparent display such that from the perspective of the user, the affordance appears to overlay at least part of the first external device visible in the background through the transparent display.

At block 416, second image data of a gesture (e.g., hand gesture 334 in FIG. 3D) is obtained with the one or more second image sensors (e.g., same image sensors used to obtain first image data at block 410). The gesture is, for example, a gesture provided between the display (e.g., display 120) and the first external device in the physical environment. In some embodiments, the gesture is made by an extremity of the user, such as the user's hand or finger(s). In other embodiments, the gesture is made by an object controlled by the user, such as a pencil or pointer. In some embodiments, block 416 is performed while displaying the representation of the physical environment at block 412.

In some embodiments, block 416 includes obtaining second depth information of the gesture using the one or more second image sensors (e.g., a depth sensor or IR sensor of image sensor(s) 108). The second depth information is obtained in a similar manner as the first depth information, described above at block 410. The second depth information is used, for example, to generate a three-dimensional representation of the gesture. In some embodiments, generating the three-dimensional representation of the gesture includes generating a depth map of the gesture.

At block 418, a representation (e.g., representation 336) of the gesture is displayed according to the second image data. In particular, the representation of the gesture is generated using the second image data and/or second depth information obtained at block 416. Block 418 is similar to block 412, except that the representation is of the gesture rather than the physical environment and the representation is generated from the second image data rather than the first image data. In some embodiments, the representation of the gesture is displayed concurrently with the representation of the physical environment (block 412) and the affordance (block 414). The displayed representation of the gesture serves to integrate the user's gesture into the reality interface provided by the user device. In embodiments where process 400 is performed using a user device having a transparent display, block 418 is optional.

At block 420, a determination is made as to whether the gesture satisfies one or more predetermined criteria associated with the function of the first external device. The determination, for example, establish whether the gesture provided by the user represents the user's intent to activate the function of the first external device.

In some embodiments, the one or more predetermined criteria are based on the physical distance between the gesture and the user device. For example, using the second depth information of the gesture obtained at block 416, a physical distance between the gesture and the user device is determined. In these embodiments, the one or more predetermined criteria include the criterion that the physical distance between the gesture and the user device is less than a predetermined distance. Such a criterion can serve to confirm whether the gesture is a gesture of the user or merely an object in the field of view that is moving independent of the user. For example, if the physical distance between the gesture and the user device is significantly greater than the average length of a human arm, then it is unlikely that the gesture represents the user's intent to active the function of the first external device.

In some embodiments, the one or more predetermined criteria are based on performing two-dimensional recognition using the second image data of the gesture obtained at block 416. For example, portions of the second image data corresponding to the gesture are compared with a plurality of stored images. The plurality of stored images are, for example, known images of gestures that correspond to the function of the first external device. In these embodiments, process 400 determines a similarity measure for one or more stored images of the plurality of stored images. The similarity measure for the one or more stored images represents the degree to which portions of the second image data match the one or more stored images. In some embodiments, the one or more predetermined criteria include the criterion that the similarity measure for one or more stored images of the plurality of stored images is greater than a predetermined threshold.

In some embodiments, the one or more predetermined criteria are based on performing three-dimensional recognition using the second image data and/or the second depth information of the gesture obtained at block 416. For example, as discussed above, a three-dimensional representation of the gesture is generated using the second image data and/or the second depth information of block 416. In these embodiments, portions of the generated three-dimensional representation of the gesture are compared with a plurality of stored three-dimensional representations of gestures corresponding to the function of the first external device. Process 400 determines, for example, a similarity measure for one or more of the plurality of stored three-dimensional representations of gestures. The similar measure represents the degree to which portions of the three-dimensional representation of the gesture match one or more of the plurality of stored three-dimensional representations of gestures. In some embodiments, the one or more predetermined criteria include a criterion that the similarity measure for one or more of the plurality of stored three-dimensional representations of gestures is greater than a predetermined threshold.

In some embodiments, the one or more predetermined criteria are based on determining a probability that the gesture provided by the user represents the user's intent to activate the function of the first external device. The probability is determined, for example, from the second image data and/or second depth information using a machine-learned classifier (e.g., a trained neural network model). In these embodiments, the second image data and/or second depth information are processed to determine vector representations of the second image data and/or second depth information. The machine-learned classifier is configured to receive the vector representations and determine, based on the received vector representations, a set of probabilities. Each probability of the set of probabilities corresponds to a respective function of a respective external device. In particular, the set of probabilities includes the probability that the gesture provided by the user represents the user's intent to activate the function of the first external device. In these embodiments, the one or more predetermined criteria include a criterion that the determined probability that the gesture provided by the user represents the user's intent to activate the function of the first external device is greater than a predetermined threshold value.

In some embodiments, the one or more predetermined criteria are based on a degree of overlap between the gesture and the displayed affordance. In some embodiments, the degree of overlap is determined using the second image data and/or second depth information obtained at block 416. In some embodiments, the degree of overlap is determined based on the gaze direction of the user. For example, a degree of overlap is based on the degree in which the displayed affordance is aligned with a portion of the gesture (e.g., an extremity of the gesture) along the gaze direction of the user. In some embodiments, the one or more predetermined criteria include a criterion that the degree determined distance is less than a predetermined threshold distance.

In some embodiments, the one or more predetermined criteria are based on the type of affordance displayed at block 414. For example, process 400 determines, based on the second image data and/or second depth information, whether the gesture corresponds to a predetermined gesture for activating the displayed affordance. In these embodiments, the one or more predetermined criteria is satisfied if it is determined that the gesture corresponds to a predetermined gesture for activating the displayed affordance. By way of example, if the displayed affordance is a virtual slider bar, the one or more predetermined criteria include the criterion that an extremity of the gesture moves from a first position to a second position along a direction that is approximately parallel to the slider bar from the perspective of the user's view position. In another embodiment, if the displayed affordance is a virtual dial, the one or more predetermined criteria include the criterion that an extremity of the gesture rotates around an axis corresponding to a center axis of the virtual dial from the perspective of the user's view position.

In accordance with determining that the identified gesture satisfies one or more predetermined criteria associated with the function, one or more of blocks 422 and 424 are performed. In accordance with determining that the identified gesture does not satisfies one or more predetermined criteria associated with the function, process 400, for example, forgoes performing blocks 422 and 424. Process 400 returns to block 416 and obtains additional image data and/or depth information of a gesture to determine whether the one or more predetermined criteria associated with the function are satisfied based on the additional obtained image data and/or depth information.

At block 422, the first external device is caused to perform the function. For example, upon determining that the gesture satisfies one or more predetermined criteria associated with the function, the user device sends a request to the first external device to perform the function. In some embodiments, the request is sent over the wireless communication connection established at block 404. In response to receiving the request from the user device, the first external device performs the function.

In some embodiments, causing the function to perform includes causing the first external device to adjust a device setting or a device operating state. For example, if the first external device were a television (e.g., external device 304 of FIGS. 3A-3D) and the function were a power ON/OFF function, volume adjustment function, or channel switching function, block 422 includes causing the television to change its: power state (e.g., from ON to OFF or OFF to ON), a volume setting (e.g., from a first value to a second value), or a channel (e.g., from a first channel to a second channel), respectively. In some embodiments where the first external device is a watch or clock and the function is an alarm function, block 422 includes causing the watch or clock to set an alarm. In some embodiments where the first external device is a phone and the function is a call function, block 422 includes causing the phone to dial a phone number. In some embodiments where the first external device is a media device and the function is a media play function, block 422 includes causing the media device to start or stop play of a media item.

In some embodiments, causing the function to perform includes causing the first external device to provide information corresponding to the function. In some embodiments, the information includes information specifying a setting or operating state of the device. In some embodiments, the information includes a media item or message item. The first external device sends, for example, the information to the user device and the user device presents the information to the user. In some embodiments, the information is presented as visual output and displayed on the display (display 120). The information is displayed, for example, concurrently with the representation of the physical environment. In some embodiments, the information is displayed as a virtual object at a position in the representation of the physical environment corresponding to the first external device. In some embodiments, the information is presented as audio output (e.g., using speaker(s) 118). In these embodiments, the user device provides audio output corresponding to the information.

By way of example, if the first external device were a watch or clock and the function were providing a time or battery life, block 422 includes causing the watch or clock to provide time information or battery life information to the user device for display. In embodiments where the first external device is a phone and the function is an address book or voicemail function, block 422 includes causing the phone to provide address book information or voicemail message items to the user device for display or playback. In embodiments where the first external device is a personal computing device and the function is a messaging function (e.g., email, text message, etc.) or a web-browsing function, block 422 includes causing the personal computing device to provide message items (e.g., unread emails, messages, etc.) or webpage items (e.g., webpage address or content) to the user device for display. In embodiments where the first external device is a media device and the function is a media play function, block 422 includes causing the media device to provide media information of a currently playing media item for display or provide a copy of the currently playing media item to the user device for playback on the user device.

In some embodiments, causing the function to perform includes causing the first external device to establish a wireless communication connection with the user device. By way of example, the user device detects the first external device (block 402) and receives information from the first external device specifying the function of establishing a wireless communication connection (block 406). However, in some embodiments, no wireless communication connection between the user device and the first external device is established prior to block 422. In these embodiments, upon determining that the gesture satisfies one or more predetermined criteria associated with the function, the user device causes the first external device to establish a wireless communication connection. For example, the user device causes the first external device to exchange connection information (e.g., pairing information) with the user device to establish the wireless communication connection.

At block 424, visual feedback of the affordance is displayed (e.g., on display 120). For example, the visual feedback corresponds to the activation of the affordance. In particular, the visual feedback indicates to the user that the affordance has been activated. For example, with reference back to FIG. 3D, in accordance with determining that hand gesture 334 satisfies one or more predetermined criteria associated with the power ON/OFF function of external device 304, user device 312 provides a visual feedback showing that affordance 316 depresses towards representation 314 of external device 304, which indicates that affordance 316 has been activated.

It should be appreciated that the type of visual feedback displayed can vary depending on the type of affordance that is displayed at block 414. For instance, in embodiments where the displayed affordance is a virtual slider bar, the displayed visual feedback includes displaying an indicator of the virtual slider bar translating from a first position to a second position. In embodiments where the displayed affordance is a virtual dial, the displayed visual feedback includes displaying the virtual dial rotating from a first position to a second position.

The foregoing descriptions of specific embodiments have been presented for purposes of illustration and description.

They are not intended to be exhaustive or to limit the scope of the claims to the precise forms disclosed, and it should be understood that many modifications and variations are possible in light of the above teaching.

What is claimed is:

1. A system comprising:
one or more processors; and
memory storing one or more programs configured to be executed by the one or more processors, the one or more programs including instructions for:
receiving, from an external device, information specifying a function of the external device;
obtaining, with one or more image sensors, first image data of a physical environment that includes the external device; and
concurrently displaying, on a display:
a representation of the physical environment according to the first image data, wherein the displayed representation of the physical environment includes a representation of the external device; and
an affordance corresponding to the function overlaid on the representation of the external device, wherein detecting user activation of the affordance causes the external device to perform an action corresponding to the function.

2. The system of claim 1, wherein the one or more programs further include instructions for:
while obtaining the first image data of the physical environment, obtaining second image data of a user captured by one or more second image sensors; and
determining, based on the second image data, a gaze direction of the user with respect to the representation of the physical environment, wherein the representation of the physical environment is displayed according to the determined gaze direction.

3. The system of claim 2, wherein the one or more programs further include instructions for:
while obtaining the second image data of the user, obtaining depth information of the user using a depth sensor, wherein the gaze direction is determined based on the depth information.

4. The system of claim 2, wherein the one or more programs further include instructions for:
while obtaining the first image data of the physical environment, obtaining sensor data from at least one of a gyroscope and an accelerometer, wherein the gaze direction is determined based on the sensor data and the second image data.

5. The system of claim 1, wherein the one or more programs further include instructions for:
prior to displaying the representation of the physical environment, automatically establishing a wireless communication connection with the external device in response to detecting the external device.

6. The system of claim 5, wherein the wireless communication connection is established using connection information obtained prior to receiving the information specifying the function of the external device.

7. The system of claim 5, wherein causing the external device to perform the function further comprises sending, using the established wireless communication connection, a request to the external device, wherein the request, when received by the external device, causes the external device to perform the function.

8. The system of claim 1, wherein causing the external device to perform the function further comprises causing the external device to exchange connection information with the system to establish a wireless communication connection between the external device and the system.

9. The system of claim 1, wherein causing the external device to perform the function further comprises causing the external device to adjust a setting or operating state of the external device.

10. The system of claim 1, wherein causing the external device to perform the function further comprises causing the external device to provide, to the system, information specifying a setting or operating state of the external device, and wherein the one or more programs further includes instructions for displaying the information on the display.

11. The system of claim 1, wherein causing the external device to perform the function further comprises causing the external device to transfer a media item or message item to the system.

12. The system of claim 1, wherein the one or more programs further include instructions for:
determining, based on the first image data, that the external device includes a physical interface configured to perform the function, wherein the affordance is displayed overlaid on the displayed representation of the external device at a position corresponding to the physical interface of the external device.

13. The system of claim 1, wherein the one or more programs further include instructions for:
while concurrently displaying the representation of the physical environment and the affordance corresponding to the function, detecting a gesture;
determining whether the gesture satisfies one or more predetermined criteria associated with the function; and
in accordance with determining that the gesture satisfies one or more predetermined criteria associated with the function, causing the external device to perform the function.

14. The system of claim 1, wherein the one or more programs further include instructions for:
in accordance with determining that the gesture satisfies one or more predetermined criteria associated with the function, displaying, on the display, visual feedback of the affordance.

15. A non-transitory computer-readable storage medium storing one or more programs configured to be executed by one or more processors, the one or more programs including instructions for:
receiving, from an external device, information specifying a function of the external device;
obtaining, with one or more image sensors, first image data of a physical environment that includes the external device;
concurrently displaying, on a display:
a representation of the physical environment according to the first image data, wherein the displayed representation of the physical environment includes a representation of the external device; and
an affordance corresponding to the function overlaid on the representation of the external device, wherein detecting user activation of the affordance causes the external device to perform an action corresponding to the function.

16. The non-transitory computer-readable storage medium of claim 15, wherein the one or more programs further include instructions for:
while obtaining the first image data of the physical environment, obtaining second image data of a user captured by one or more second image sensors; and determining, based on the second image data, a gaze direction of the user with respect to the representation of the physical environment, wherein the representation of the physical environment is displayed according to the determined gaze direction.

17. The non-transitory computer-readable storage medium of claim 16, wherein the one or more programs further include instructions for:

while obtaining the second image data of the user, obtaining depth information of the user using a depth sensor, wherein the gaze direction is determined based on the depth information.

18. The non-transitory computer-readable storage medium of claim 16, wherein the one or more programs further include instructions for:

while obtaining the first image data of the physical environment, obtaining sensor data from at least one of a gyroscope and an accelerometer, wherein the gaze direction is determined based on the sensor data and the second image data.

19. A method comprising:

at an electronic device having a processor and memory:
receiving, from an external device, information specifying a function of the external device;
obtaining, with one or more image sensors, first image data of a physical environment that includes the external device;
concurrently displaying, on a display:
a representation of the physical environment according to the first image data, wherein the displayed representation of the physical environment includes a representation of the external device; and
an affordance corresponding to the function overlaid on the representation of the external device, wherein detecting user activation of the affordance causes the external device to perform an action corresponding to the function.

20. The method of claim 19, further comprising:
while obtaining the first image data of the physical environment, obtaining second image data of a user captured by one or more second image sensors; and
determining, based on the second image data, a gaze direction of the user with respect to the representation of the physical environment, wherein the representation of the physical environment is displayed according to the determined gaze direction.

* * * * *